United States Patent [19]
Brown et al.

[11] Patent Number: 5,600,654
[45] Date of Patent: Feb. 4, 1997

[54] MULTIPLE CALL OFFERING METHOD FOR USE WITH AN ANALOG STATION AND AN ISDN STATION THAT SHARE A DIRECTORY NUMBER

[75] Inventors: Louis D. Brown, Clarendon Hills; Linda M. Smedinghoff, Wheaton, both of Ill.

[73] Assignee: Lucent Technologies Inc., Murray Hill, N.J.

[21] Appl. No.: 450,294

[22] Filed: May 25, 1995

Related U.S. Application Data

[63] Continuation of Ser. No. 99,295, Jul. 29, 1993, abandoned.
[51] Int. Cl.$^6$ .................................................. H04M 3/42
[52] U.S. Cl. .................... 370/524; 379/157; 379/164; 379/165; 379/215
[58] Field of Search ........................... 370/110.1, 110.2, 370/110.3, 53, 58.1, 60.1, 68.1, 119; 379/156, 157, 158, 164, 165, 96, 215, 142, 372, 373, 376, 396, 201, 210, 211, 380

[56] References Cited

U.S. PATENT DOCUMENTS

| | | | |
|---|---|---|---|
| 4,873,717 | 10/1989 | Davidson et al. | 379/211 |
| 4,899,358 | 2/1990 | Blakley | 379/215 |
| 4,907,259 | 3/1990 | Frech | 379/164 |
| 4,995,074 | 2/1991 | Goldman et al. | 379/215 |

*Primary Examiner*—Wellington Chin
*Assistant Examiner*—Huy D. Vu
*Attorney, Agent, or Firm*—Jack R. Penrod; Ross T. Watland

[57] ABSTRACT

A call offering method for use when a directory number is shared by an analog station and an ISDN station. The ISDN station has multiple call appearances of the shared directory number that are linked logically to multiple analog station states that correspond to the offering of multiple calls.

14 Claims, 26 Drawing Sheets

5,600,654

MULTIPLE CALL OFFERING METHOD FOR USE WITH AN ANALOG STATION AND AN ISDN STATION THAT SHARE A DIRECTORY NUMBER

This application is a continuation of application Ser. No. 08/099,295, filed on Jul. 29, 1993 now abandoned.

TECHNICAL FIELD

This invention relates to telecommunications.

BACKGROUND AND PROBLEM

Several arrangements exist for accessing a plurality of telephone central office lines from a single station set. The oldest and most commonly used arrangement is an electro-mechanical key telephone where several central office lines are brought into a single station, connection between the central office lines and the telephone apparatus being made mechanically through a switch. In a typical key telephone, several central office lines are brought in parallel into a single telephone station, and the station is equipped with keys and switches in order to connect each of the central office lines, one line at a time, with a single telephone apparatus. Because several stations typically must have access to the same central office lines a key telephone system includes a distribution box which distributes the tip and ring wires from each central office line, in parallel, to the several telephone stations. When several stations share several central office lines, visual indicators are associated with the keys for signaling purposes to identify, for example, which central office line is ringing, which line is engaged, or which line is on hold.

An alternative arrangement is the electronic key system in which each telephone apparatus is accessed by only one pair of tip and ring wires. Switching between the various central office lines and the telephone stations is done in a central, electronically controlled switching matrix located in an electronic key service unit. Typically, the telephone station contains keys which enable the user to identify to the switching matrix which central office line the user wishes to have connected to that station. Signaling and visual status indicators are made available to stations via additional wires, which carry the necessary electronic signals to perform the central office line selection and control, and to turn on and off the visual indicators.

Although key-system services are popular among a large class of customers, the provision of specialized wiring and distribution arrangements for key-system stations is expensive and inflexible. A recent approach to the provision of key-system services is to connect each station via an individual line to a stored program controlled, central office or private branch exchange (PBX) switching system and to have the central control of that system coordinate the processing of calls to and from members of key-system groups. Accordingly, no specialized wiring or distribution arrangements are required for the key-system stations.

One example of a central office switching system providing key-system services via individual lines is the integrated services digital network (ISDN) switching system disclosed in D. J. Ahnen et al. U.S. Pat. No. 4,791,662 on Dec. 13, 1988, where each key-system group comprises two or more customer stations that share a directory number even though they are connected via individual lines. Each group can include one or more ISDN lines and at most one conventional analog line. The capability to include one analog line in a key-system group is very important in applications such as work-at-home, where a customer has one analog line intended for personal voice communication and one ISDN line intended primarily for work-related voice and data communication but also usable for personal voice communication. This is an attractive arrangement because it is less expensive than multiple ISDN stations and lines. A typical application is shown in FIG. 26 where a central office switching system 110 provides service to a residence via an ISDN line 131 to an ISDN station 130 and an associated personal computer 140, and via a conventional analog line 121 to analog station 120. Note that ISDN station 130 has a directory number DN2000 (the "work number") with three call appearances CA1 through CA3, and a directory number DN1000 (the "home number") with a single call appearance CA1 that is shared with the single "call appearance" of analog station 120.

An important drawback of the prior art arrangement (FIG. 26) relates to the widely deployed call waiting feature. With conventional analog stations, a call waiting tone is transmitted to alert the station that a second call is incoming for the directory number. Flash-hook signaling is then used to connect the station to the second call and to subsequently connect the station to either the first or second call. With ISDN stations, the equivalent feature is implemented using multiple call appearances of the directory number, e.g., call appearances CA1 through CA3 of directory number DN2000. While a party is active on DN2000-CA1, a second call may be offered on DN2000-CA2 and the party can take the second call by depressing the button for DN2000-CA2. The first call is automatically placed on hold. The party subsequently returns to the first call by depressing the button for DN2000-CA1. With the prior art arrangement (FIG. 26) however, it is not possible to provide call waiting to analog station 120 having a given DN, e.g., DN1000, and to also offer multiple calls at multiple call appearances of the given DN at ISDN station 130.

Solution

This deficiency is eliminated and a technical advantage is achieved in accordance with the principles of the invention in an exemplary call offering method for use when a directory number is shared by an analog station and an ISDN station, where the ISDN station has multiple call appearances of the shared directory number that are advantageously linked logically to multiple analog station states that correspond to the offering of multiple calls.

A method in accordance with the invention is used by a switching system in serving at least one analog station via an analog line and at least one ISDN station via an ISDN line. A given directory number is assigned to both the analog station and the ISDN station. In response to a first call to or from the given directory number, a call connection is established with the analog station for the first call. Indication of an active status is effected at a first call appearance of the given directory number at the ISDN station. In response to a second call to the given directory number, a call offering signal is provided to the analog station and alerting is effected at a second call appearance of the given directory number at the ISDN station.

Illustratively, the switching system responds to flash-hook signaling from the analog station by placing the first call on hold, connecting the second call to the analog station, and effecting indication of an active status at the second call appearance. The switching system responds to signaling caused by depressing the second call appearance button by bridging the second call appearance onto the second call.

Another method of the invention is used when the call connection for the first call is established with the ISDN station and indication of an active status is effected at the first call appearance of the given directory number at the ISDN station. The switching system responds to a second call to the given directory number by effecting alerting at the analog station and at a second call appearance of the given directory number at the ISDN station.

Illustratively, the switching system responds to answer signaling from the ISDN station by placing the first call on hold, connecting the second call to the ISDN station and effecting indication of an active status at the second call appearance. The analog station may retrieve the first call from hold or bridge onto the second call by transmitting a dial code.

Additionally, when the switching system receives answer signaling from the analog station rather than the ISDN station, the second call is connected to the analog station and an active status is indicated at the second call appearance.

After the first call is answered by the ISDN station, a second call may be completed from the analog station and an active status indicated at the both the first and second call appearances.

DRAWING DESCRIPTION

DETAILED DESCRIPTION

Figure 1:
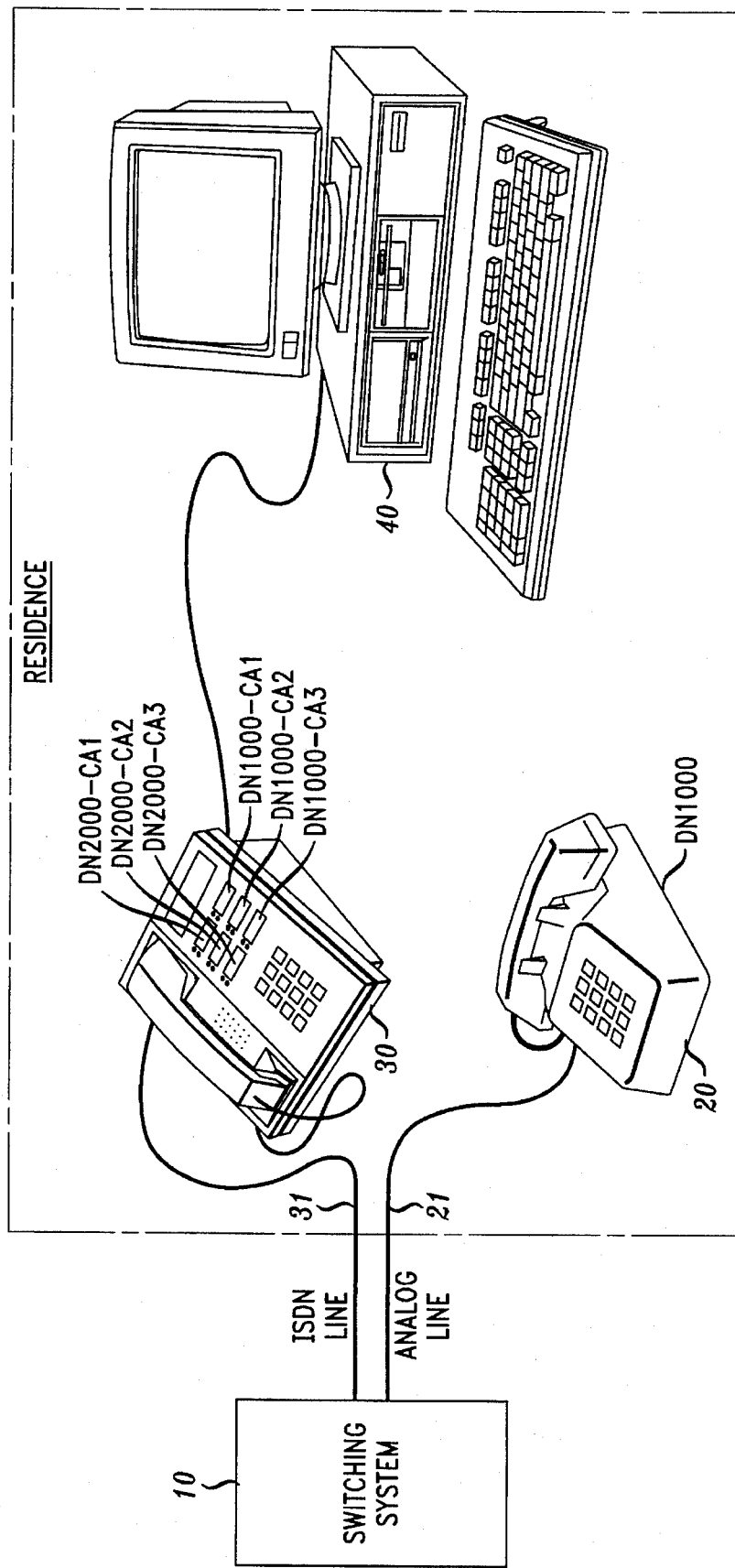
FIG. 1 is a diagram of an arrangement where an exemplary method of the invention is performed.

FIG. 1 is a diagram of an arrangement where an exemplary method of the invention is performed. A central office switching system 10 is of the type disclosed in the above-referenced Ahnen et al. patent where the control software is modified as described in detail herein to perform the exemplary method. Switching system 10 provides service to a residence via an ISDN line 31 to an ISDN station 30 and an associated personal computer 40, and via a conventional analog line 21 to analog station 20. ISDN station 30 has a directory number DN2000 (the "work number") with three call appearances CA1 through CA3, and a directory number DN1000 (the "home number") with three call appearances CA1 through CA3. DN1000 is shared by ISDN station 30 and analog station 20. Call appearance DN1000-CA3 is for outgoing calls only. Call appearances DN1000-CA1 and DN1000-CA2 are logically linked to two flash-hook states of analog station 20. The focus of the following description is on the exemplary method performed by switching system 10 with respect to analog station 20 and call appearances DN1000-CA1 and DN1000-CA2 of ISDN station 30.

Table 1 provides the status of DN1000 with respect to analog station 20 and call appearances DN1000-CA1 and DN1000-CA2 of ISDN station 30 for call scenarios which start with a first call being connected to analog station 20.

TABLE 1

| | | 1st Call - Analog Connect | | |
|---|---|---|---|---|
| | | Analog Station 20 | ISDN Station 30 (DN 1000-CA1) | ISDN Station 30 (DN 1000-CA2) |
| A | 1st Incoming alert | Ringing | Ringing/Flash | Idle |
| B | 1st Incoming Connect | Off-hook | Steady | Idle |
| C | 1st Outgoing | Off-hook | Steady | Idle |
| Scenario 1 | | | | |
| D | 2nd Call Inc. Alert | Call Offering Tone | Steady | Flashing/Ring |
| E | 2nd Call Inc. Connect to Analog | Flash to Connect | Hold | Steady |
| F | Bridging from ISDN CA2 | Off-hook | Steady | Touch/Steady |
| Scenario 2 | | | | |
| G | Bridging from ISDN-CA1 | No change (Off-hook) | Touch/Steady | Idle |
| H | 2nd Call Inc. Alert | Call Offering Tone | Steady | Flashing/Ringing |
| I | 2nd Call Inc. Connect to Analog | Flash to Connect | Steady | Steady |

Figure 2:
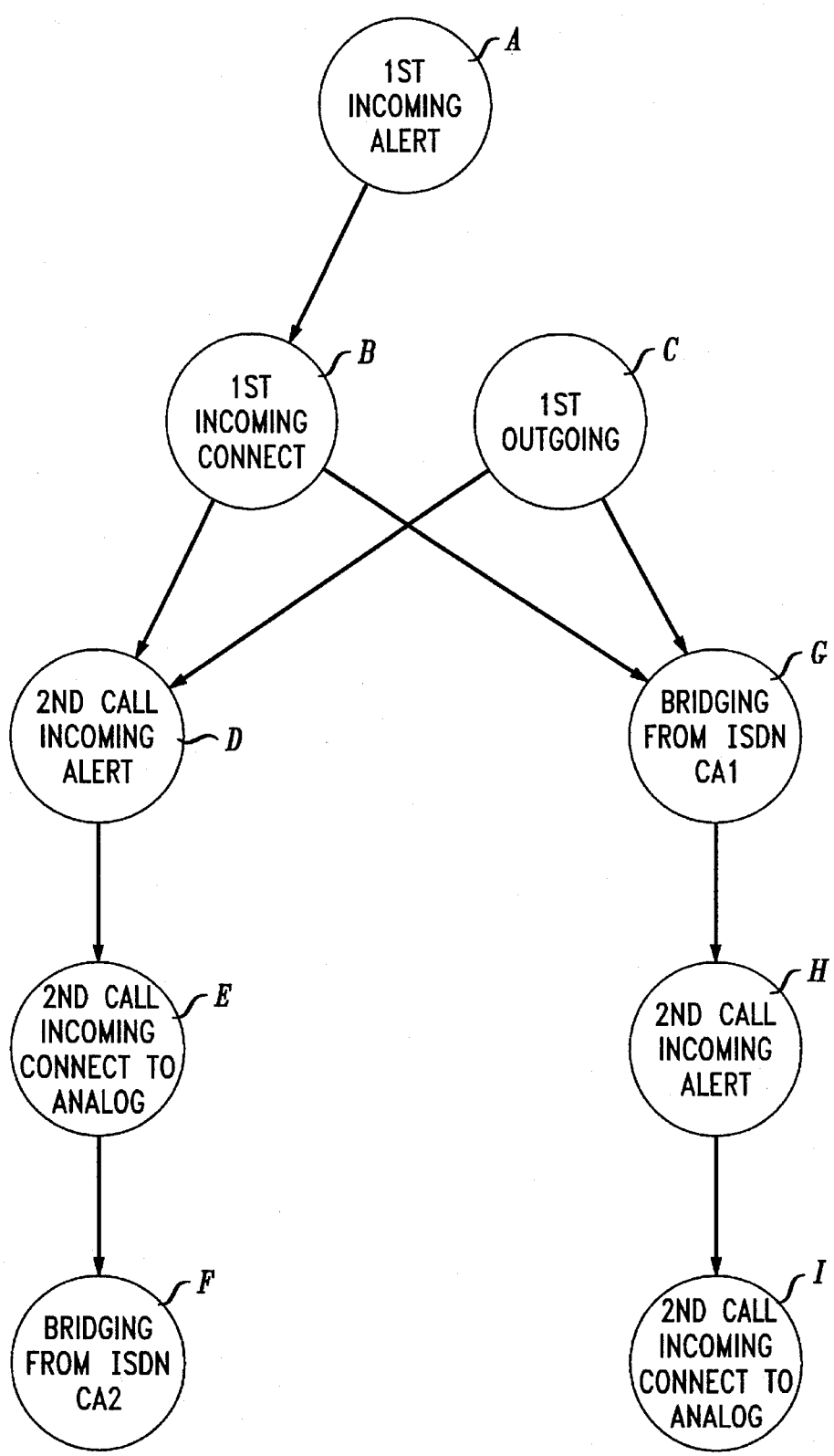
FIG. 2 is a diagram showing the sequential relationships of the lines of Table 1 herein.

The lettered lines A through I of Table 1 each define the DN1000 status at a different point in time. The sequential relationships of the Table 1 lines is shown in FIG. 2. Consider the following scenario where DN1000-CA1 and DN1000-CA2 are referred to as the first and second call appearances, respectively, of ISDN station 30. When a first call comes in to DN 1000, both analog station 20 and ISDN station 30 ring and the first call appearance of station 30 flashes (line A). Analog station 20 goes off-hook and the first call appearance of ISDN station 30 is lit steady (line B). When a second call comes in to DN 1000, a call offering tone is provided to analog station 20, ISDN station 30 rings and the second call appearance of station 30 flashes (line D). The flash-hook of analog station 20 is depressed to connect the second call to analog station 20, the first call is placed on hold, and the second call appearance of station 30 is lit steady (line E). When the second call appearance of ISDN station 30 is touched, station 30 is bridged onto the second call (line F).

Alternatively, ISDN station 30 may bridge onto the first call if the first call appearance of station 30 is touched before the second call (line G). As before, when the second call comes in to DN1000, a call offering tone is provided to analog station 20, ISDN station 30 rings and the second call appearance of station 30 flashes (line H). The flash-hook of analog station 20 is depressed to connect the second call to analog station 30 and the second call appearance of station 30 is lit steady (line I).

The same scenarios are followed when the first call is an outgoing call from analog station 20 (letter C).

Table 2 provides the status of DN1000 with respect to analog station 20 and the first and second call appearances of ISDN station 30 for call scenarios which start with a first call being connected to ISDN station 30.

TABLE 2

1st Call - ISDN Connect on CA1

| | | Analog Station 20 | ISDN Station 30 (DN 1000-CA1) | ISDN Station 30 (DN 1000-CA2) |
|---|---|---|---|---|
| a | 1st Incoming alert | Ringing | Ringing/Flash | Idle |
| b | 1st Incoming Connect | On-hook | Touch/Steady | Idle |
| c | 1st Outgoing | On-hook | Touch/Steady | Idle |
| Scenario 1 | | | | |
| d | 2nd Call Inc. Alert | Ringing | Steady | Flashing/Ring |
| e | 2nd Call Inc. Connect to ISDN | On-hook | Hold | Touch/Steady |
| f | Bridging from Analog to CA2 | Off-hook (No Outgoing Call Notify) | Hold | Steady |
| g | Bridging from Analog to CA2 | Code *2 | Hold | Steady |
| h | 2nd Call Inc. Connect to Analog | Off-hook | Steady | Steady |
| Scenario 2 | | | | |
| i | 2nd Call Outgoing on Analog | Off-hook | Steady | Steady |
| Scenario 3 | | | | |
| j | Bridging from Analog to CA1 | Off-hook (Dial tone) | Steady | Steady |
| k | Bridging from Analog to CA1 | Code *1 | Steady | Idle |
| l | 2nd Call Inc. Alert | Call Offering Tone | Steady | Flashing/Ring |
| m | 2nd Call Inc. Connect to Analog | Flash to Connect | Steady | Steady |

Figure 3:
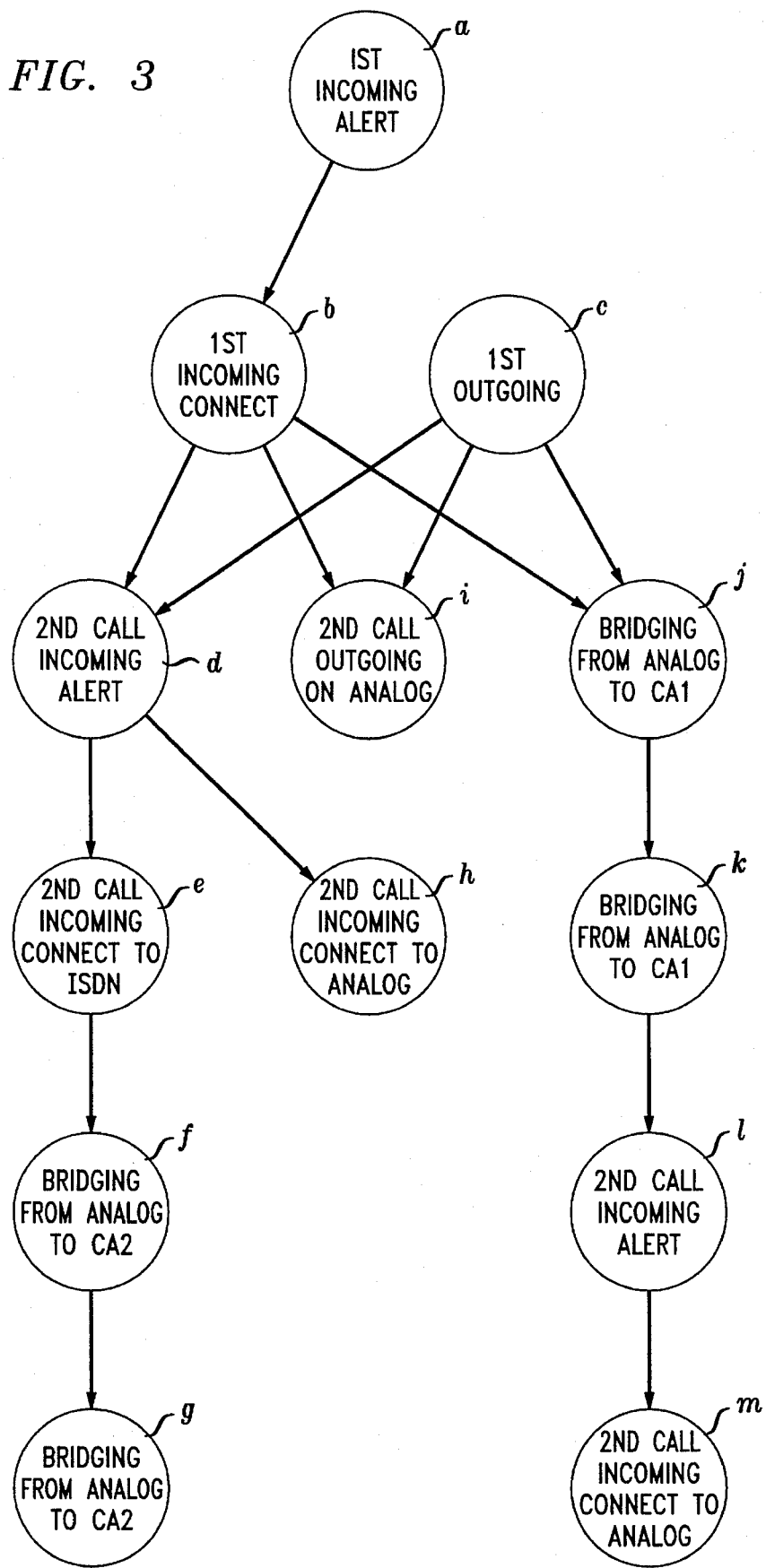
FIG. 3 is a diagram showing the sequential relationships of the lines of Table 2 herein.

The lettered lines a through m of Table 2 each define the DN1000 status at a different point in time. The sequential relationships of the Table 2 lines is shown in FIG. 3. When a first call comes in to DN1000, both analog station 20 and ISDN station 30 ring and the first call appearance of station 30 flashes (line a). ISDN station 30 goes off-hook (or the first call appearance is touched if station 30 is already off-hook), and the first call appearance of station 30 is lit steady (line b). When a second call comes in to DN1000, analog station 20 and ISDN station 30 both ring and the second call appearance of station 30 flashes (line d). When the second call appearance of ISDN station 30 is touched, the second call is connected to station 30 and the first call, which is on the first call appearance of station 30, is placed on hold (line e). When analog station 20 subsequently goes off-hook, it is notified that no outgoing call is allowed (line f), and station 20 is bridged onto the second call when a special dial code, e.g., *2, is dialed (line g).

Alternatively from line d, the second call may be answered by analog station 20 going off-hook. In that case, the second call appearance of ISDN station 30 is lit steady (line h).

From line b, a second call may be made from analog station 20 while ISDN station 30 is still active on the first call. The first and second call appearances of ISDN station 30 are lit steady (line i).

From line b, when analog station 20 goes off-hook it receives dial tone (line j). When a special dial code, e.g., *1, is dialed, analog station 20 is bridged onto the first call and the second call appearance of ISDN station 30 goes unlit (line k). When a second call then comes in to DN1000, a call offering tone is provided to analog station 20, ISDN station 30 rings and the second call appearance of station 30 flashes (line 1). The flash-hook of analog station 20 is depressed to connect the second call to station 20, and the second call appearance of ISDN station 30 is lit steady.

The same scenarios are followed when the first call is an outgoing call from the first call appearance of ISDN station 30 (line c).

Figure 4:
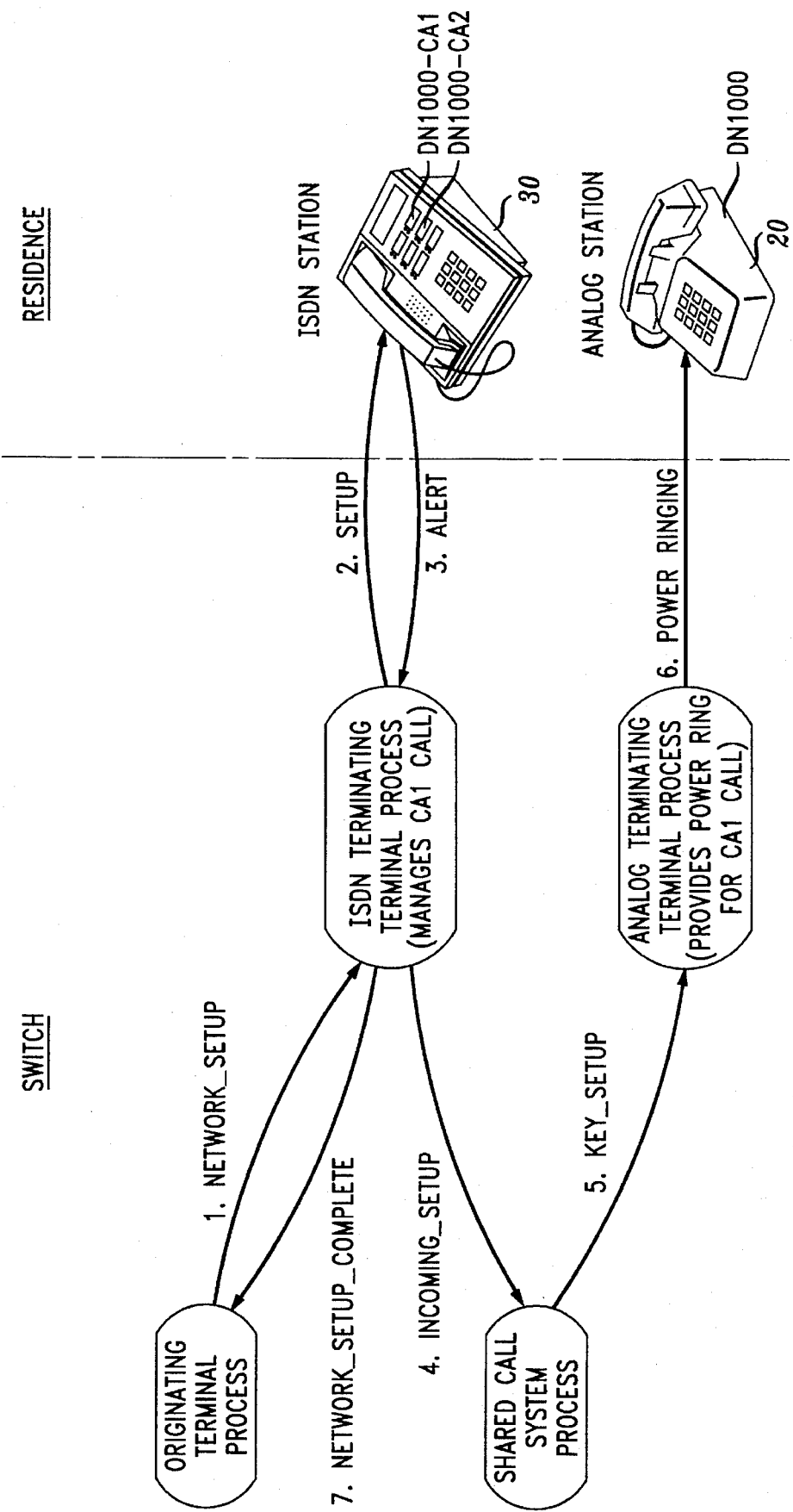
FIGS. 4–25 are process diagrams associated with the implementation of Tables 1 and 2.
Figure 5:
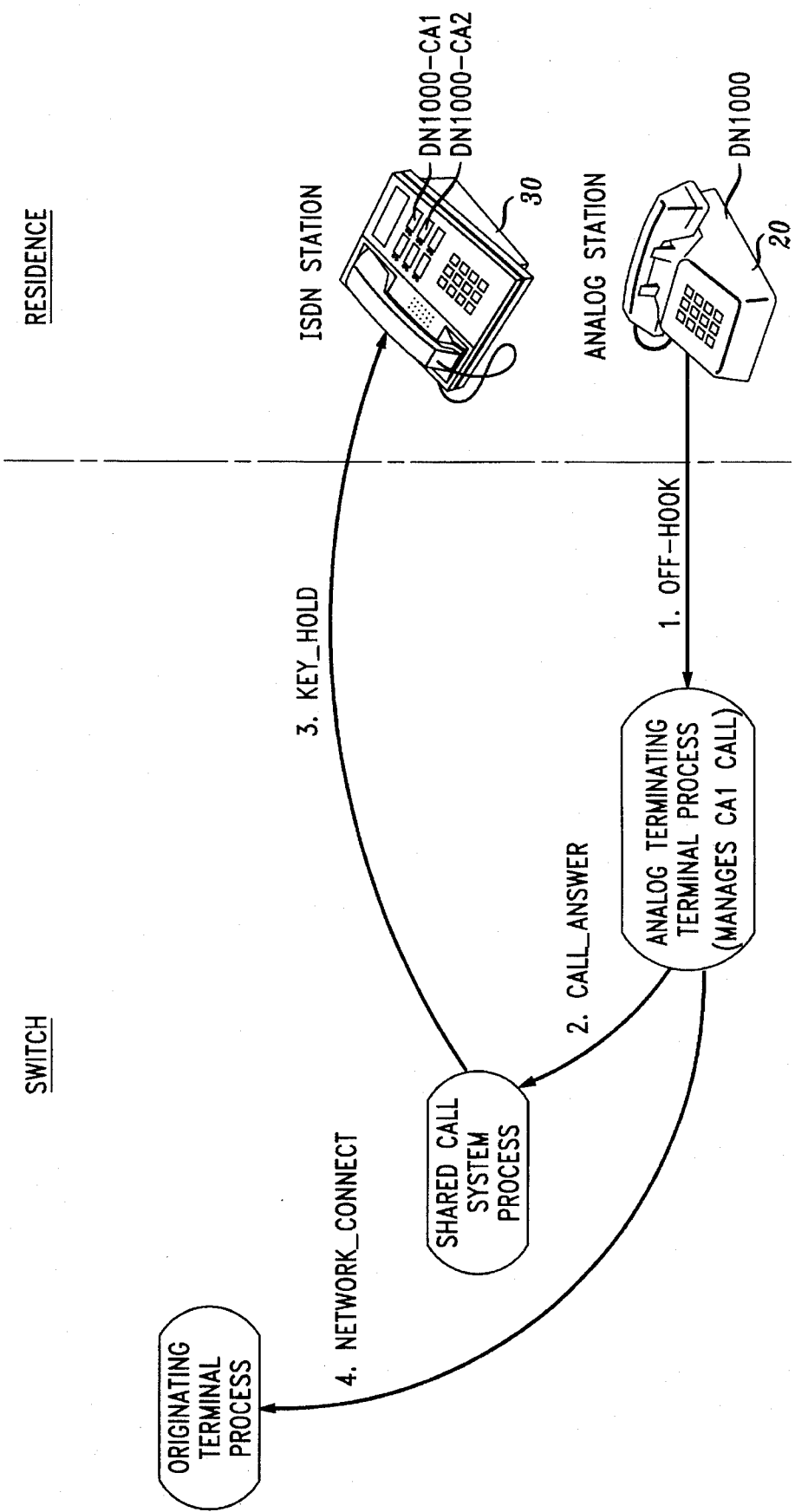
Figure 6:
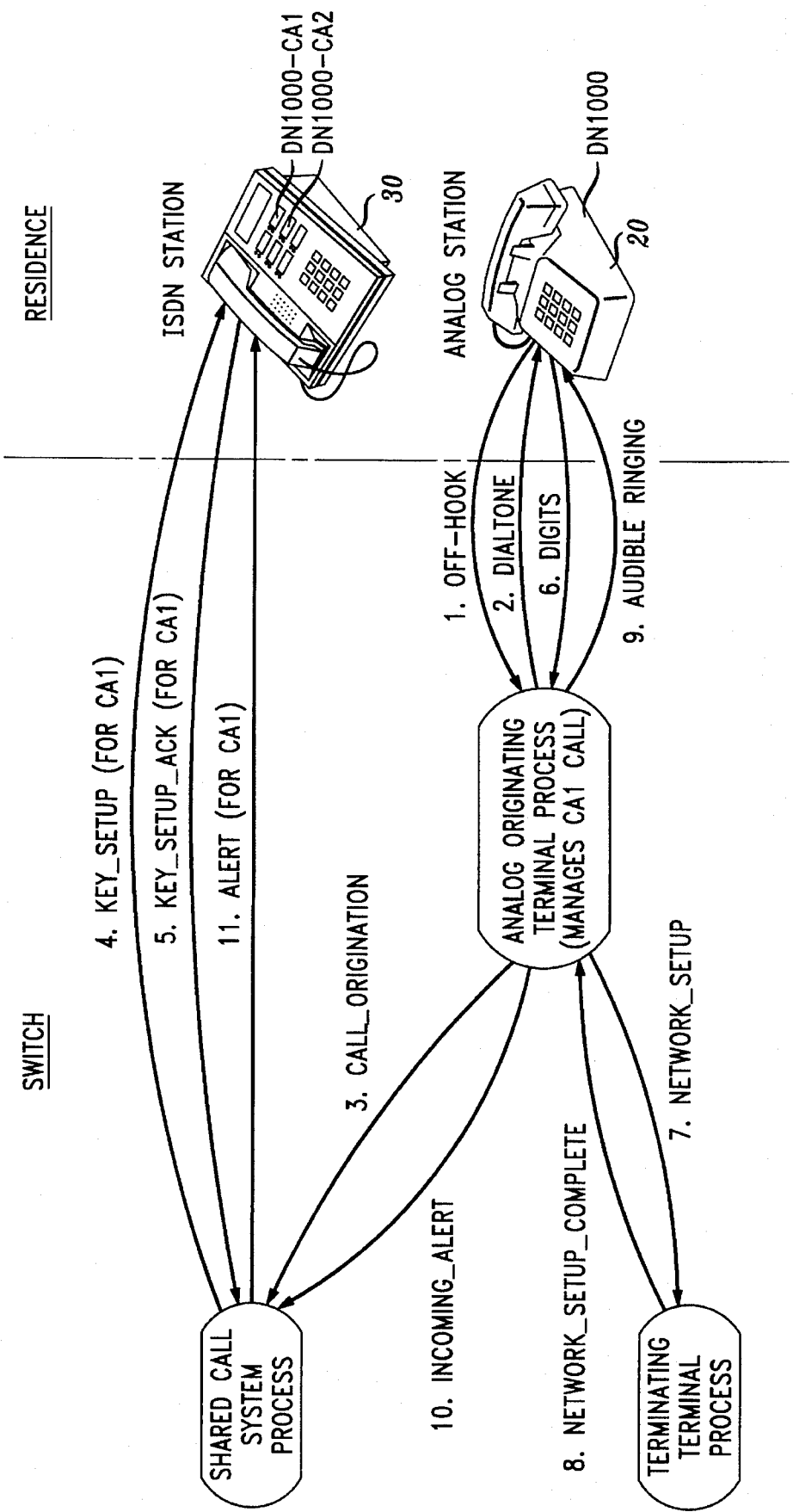
Figure 7:
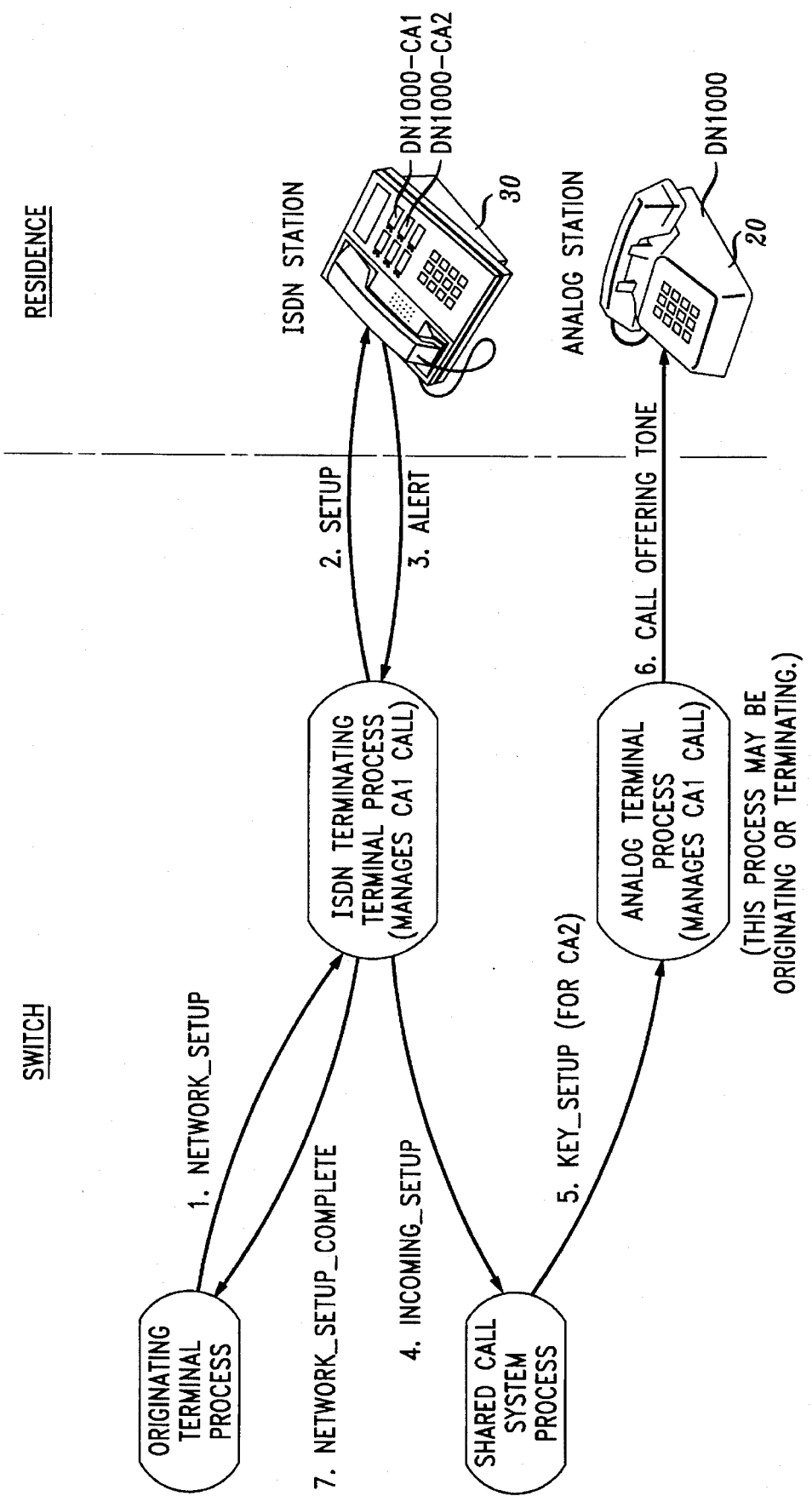
Figure 8:
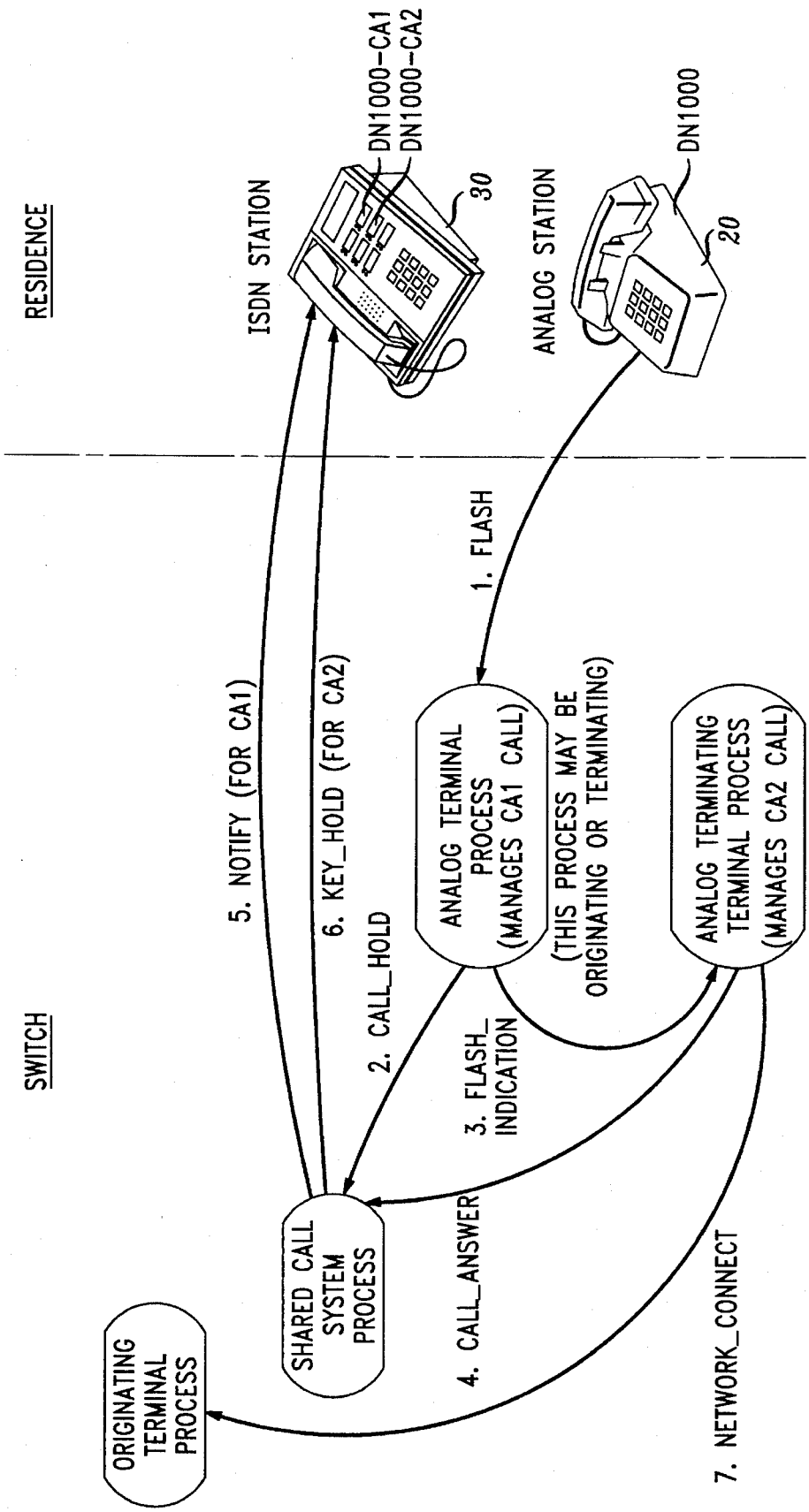
Figure 9:
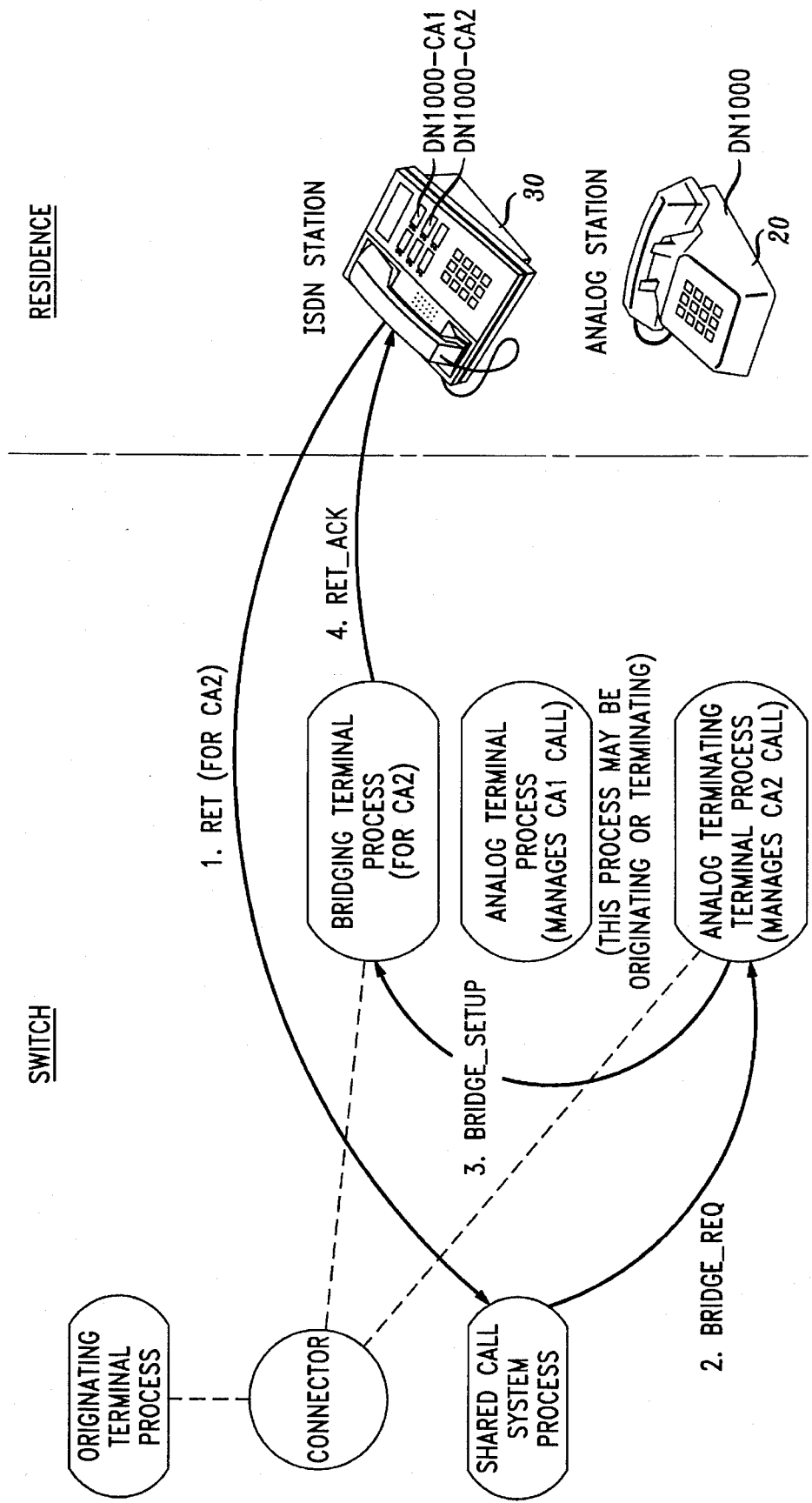
Figure 10:
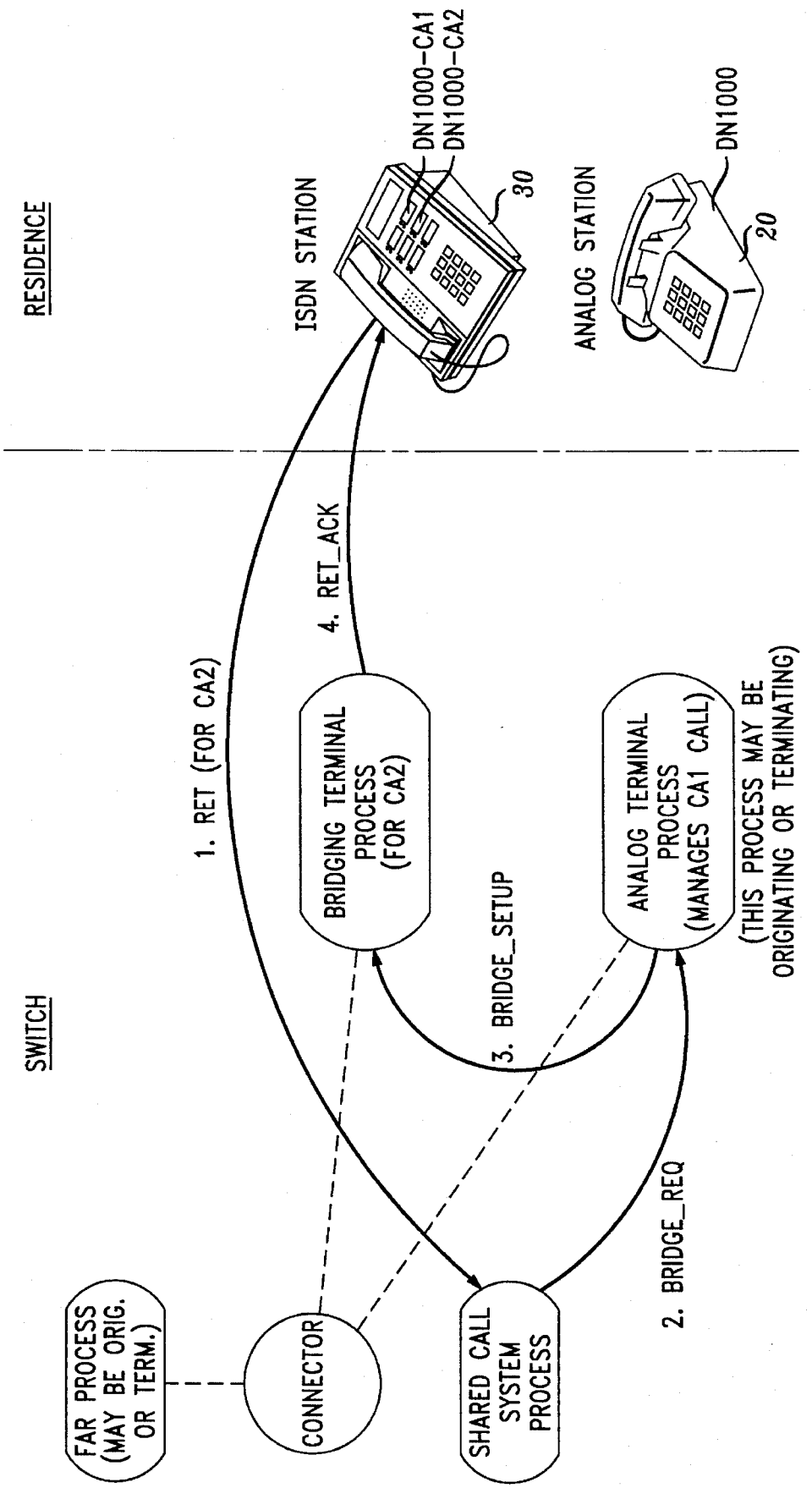
Figure 11:
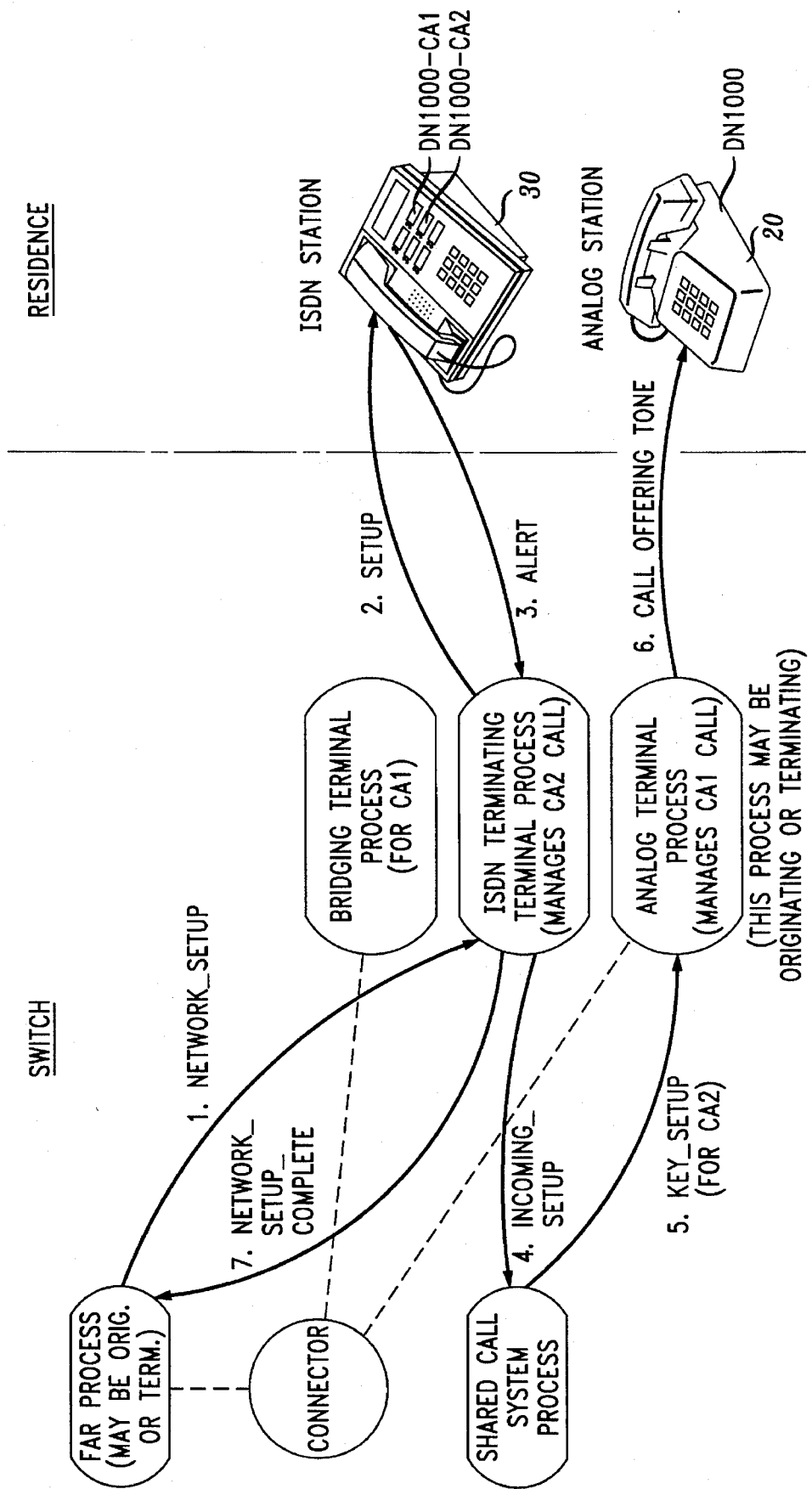
Figure 12:
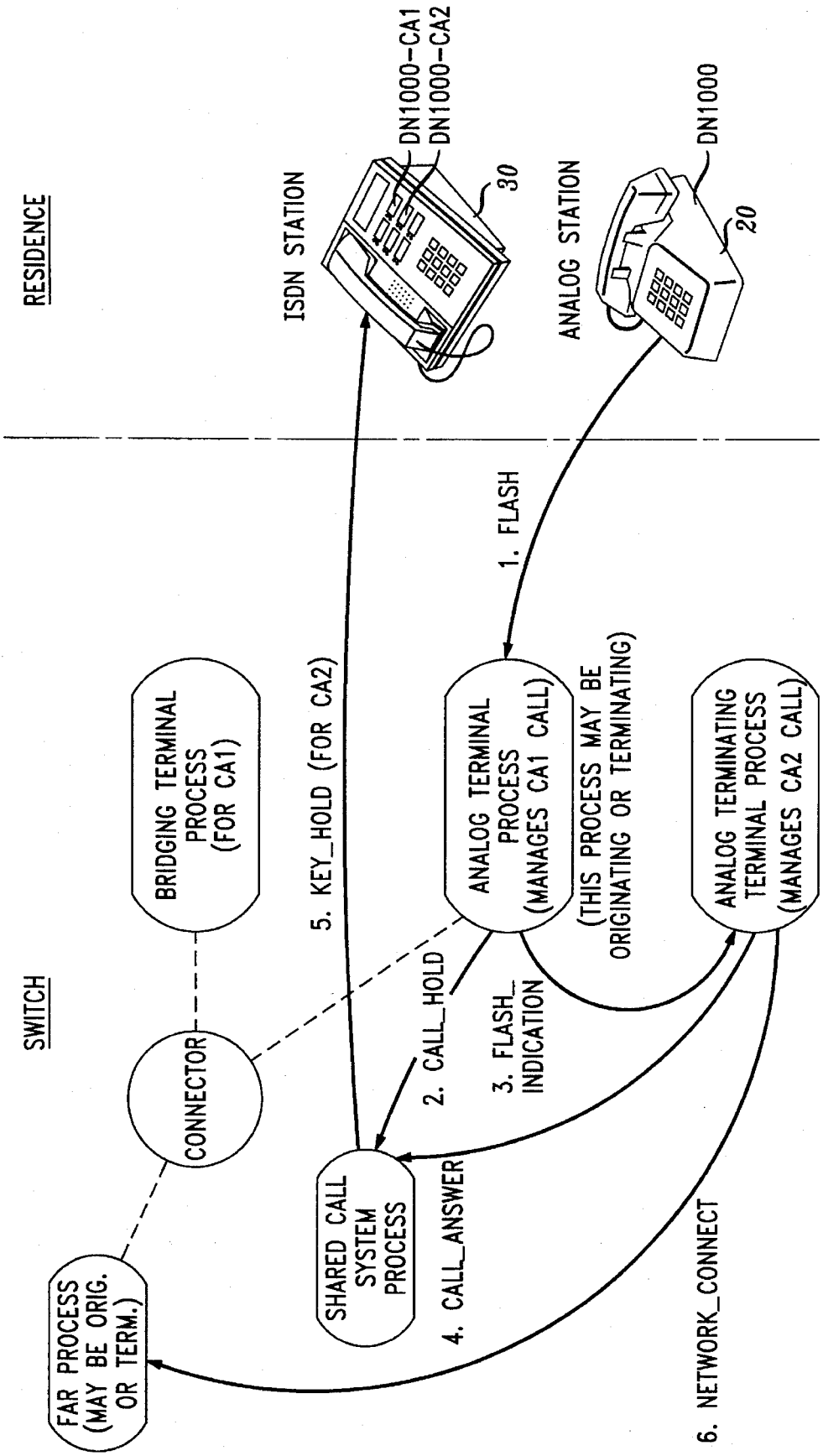
Figure 13:
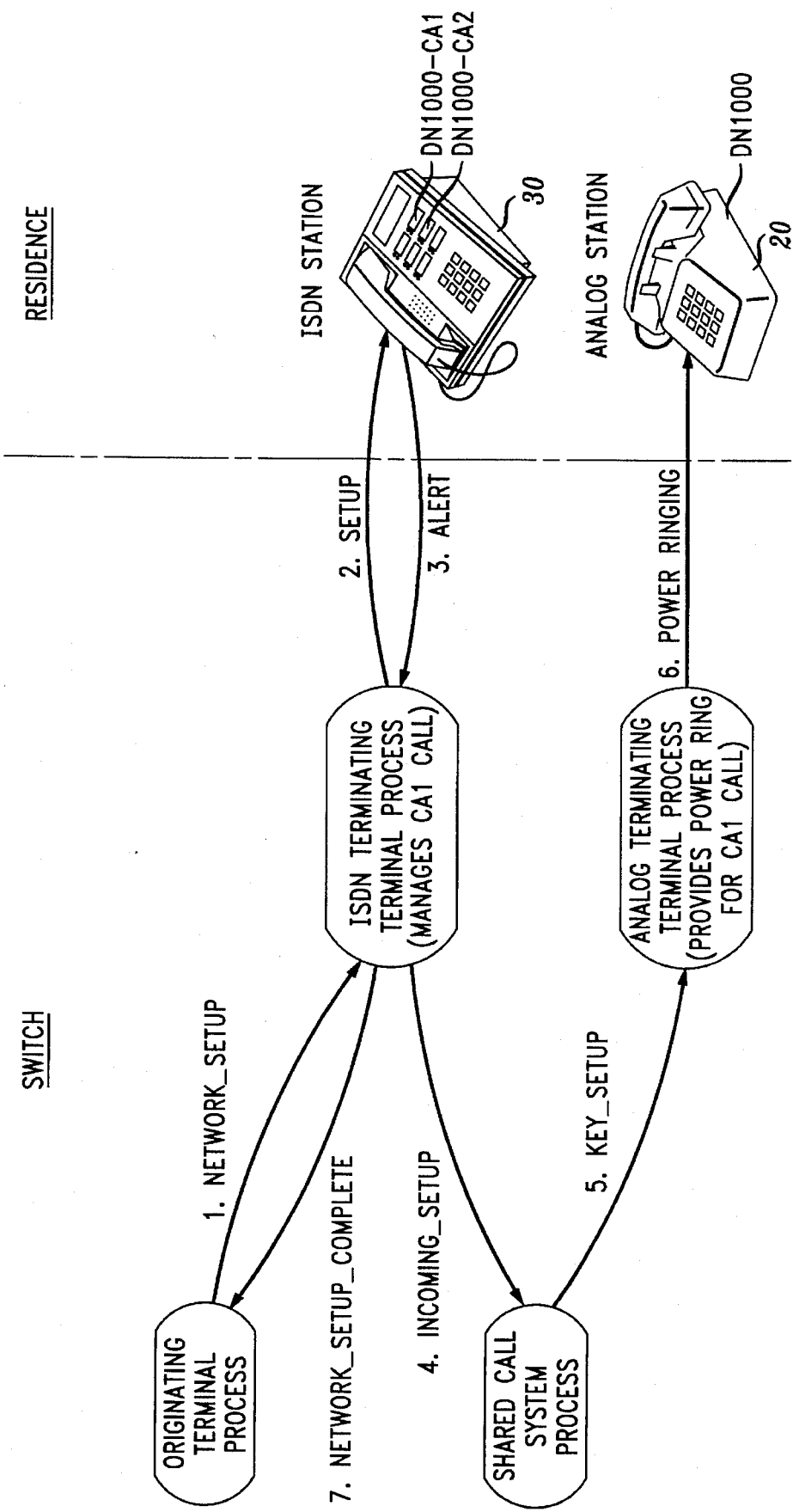
Figure 14:
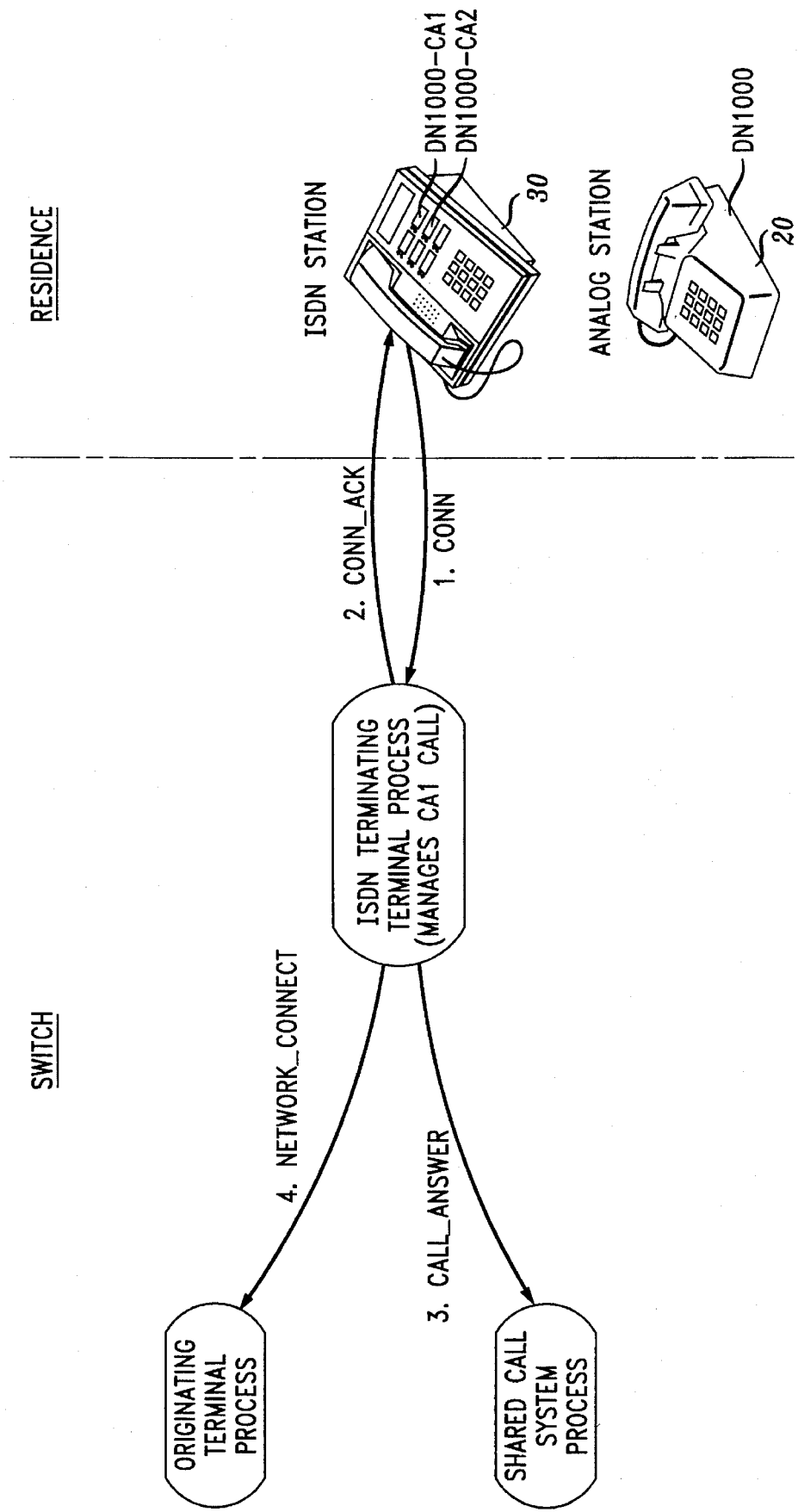
Figure 15:
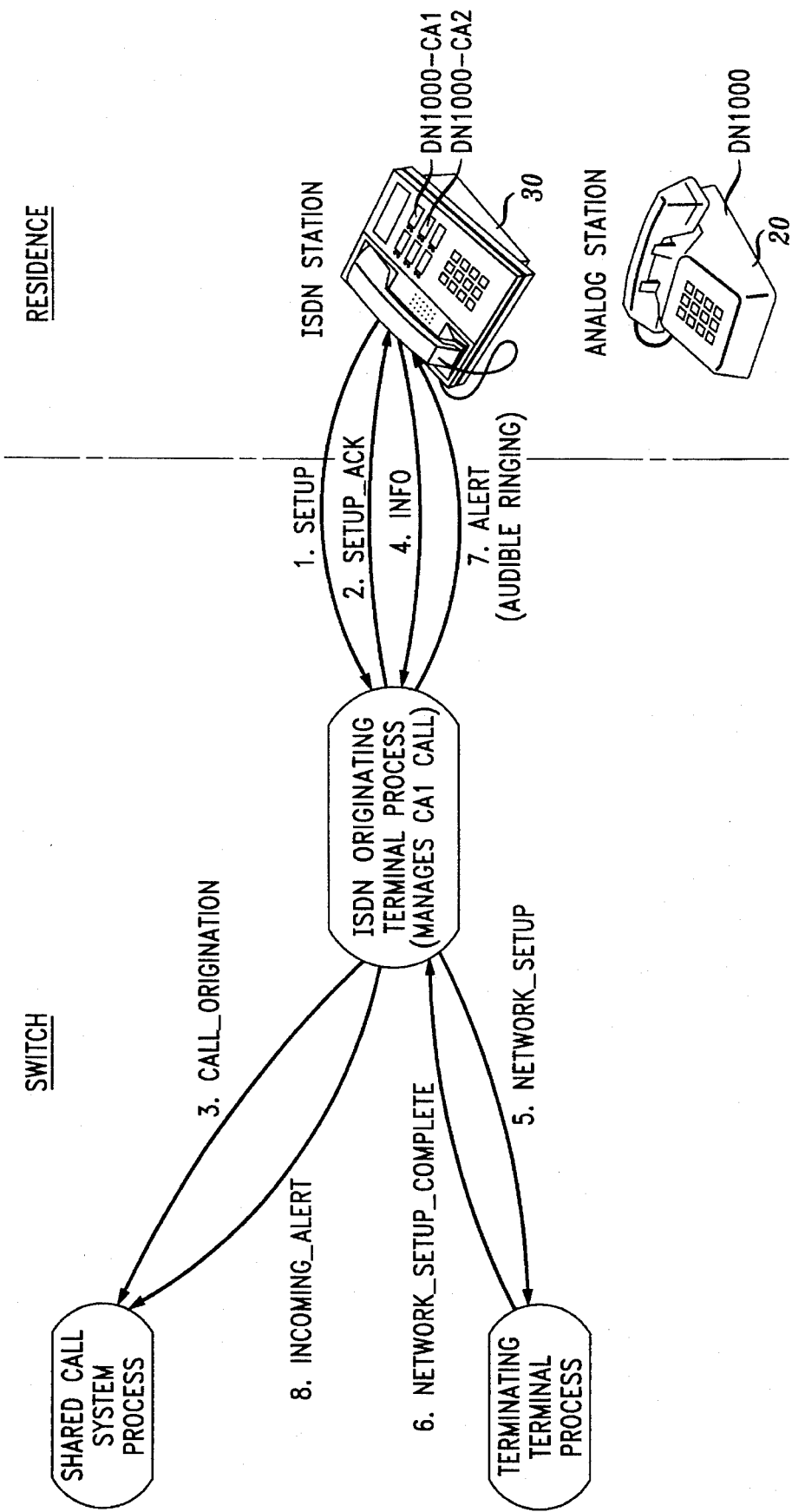
Figure 16:
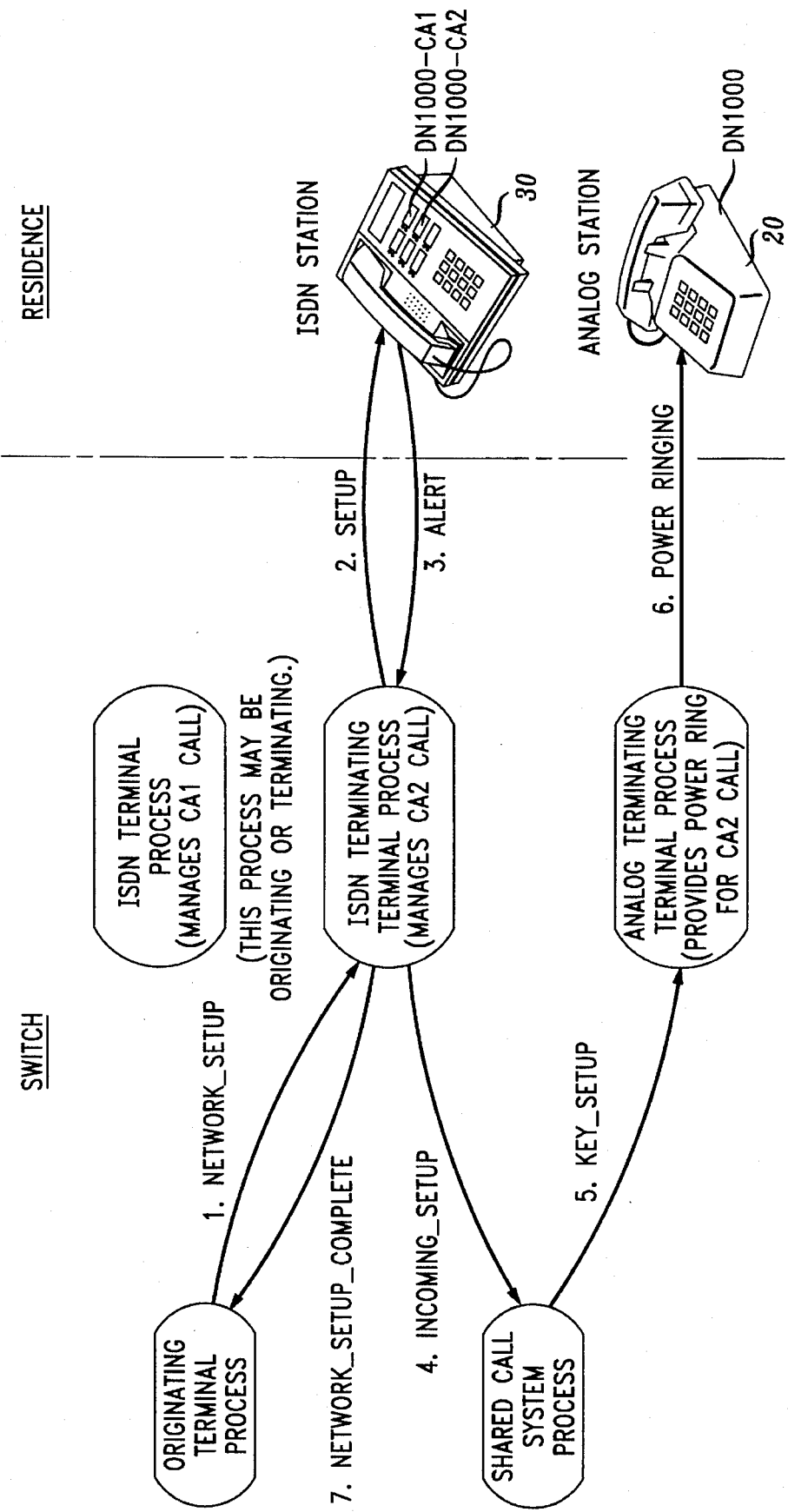
Figure 17:
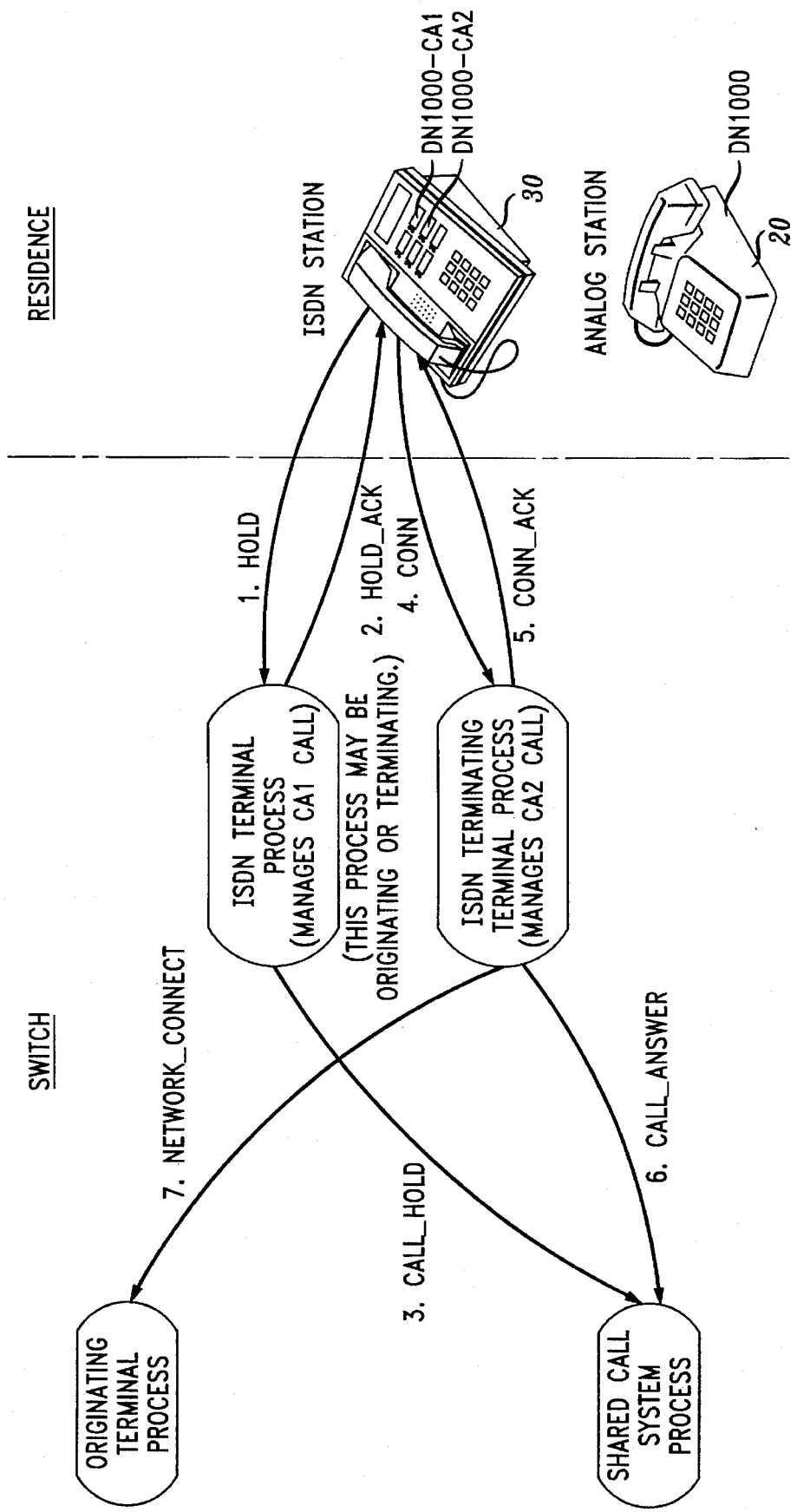
Figure 18:
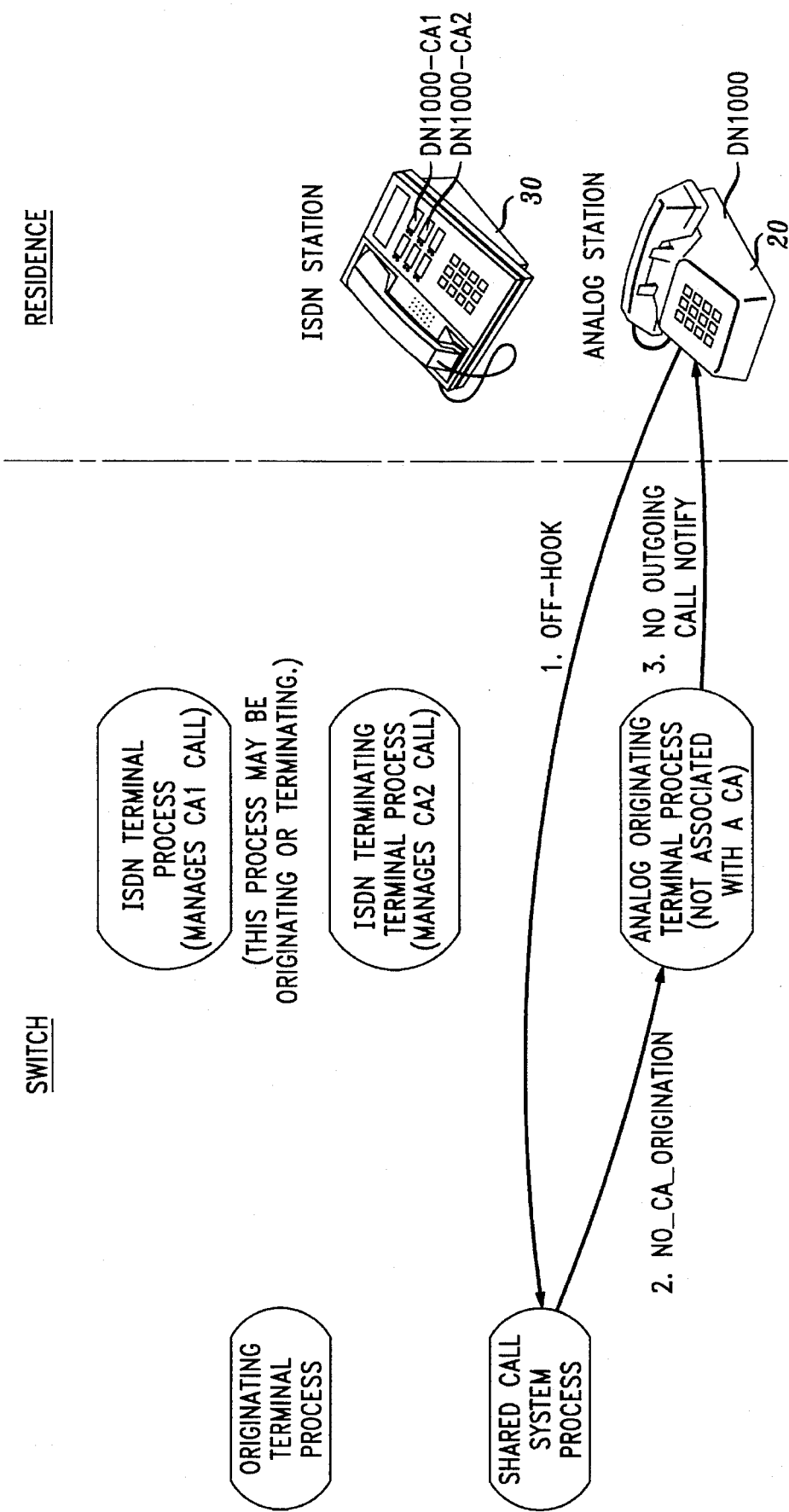
Figure 19:
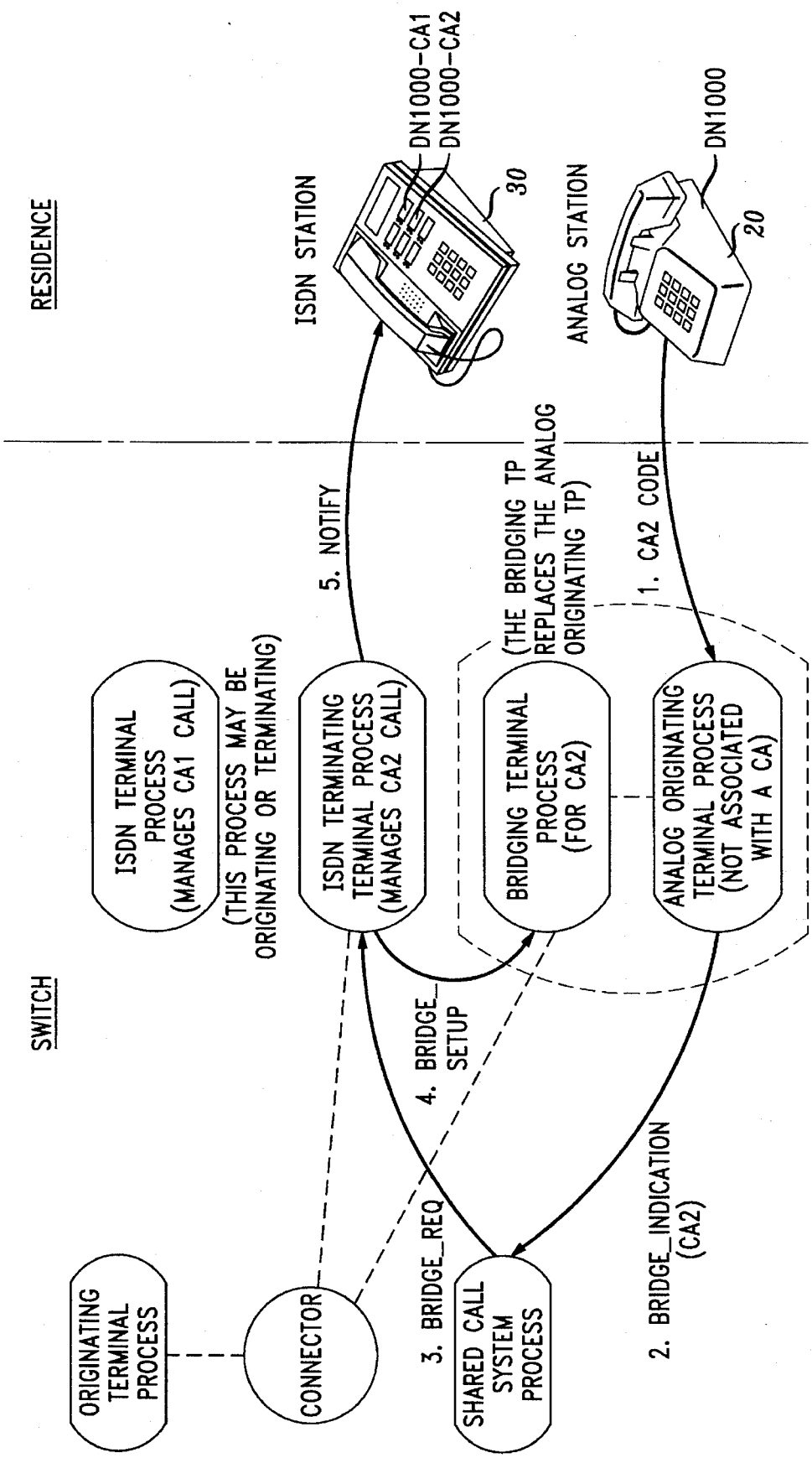
Figure 20:
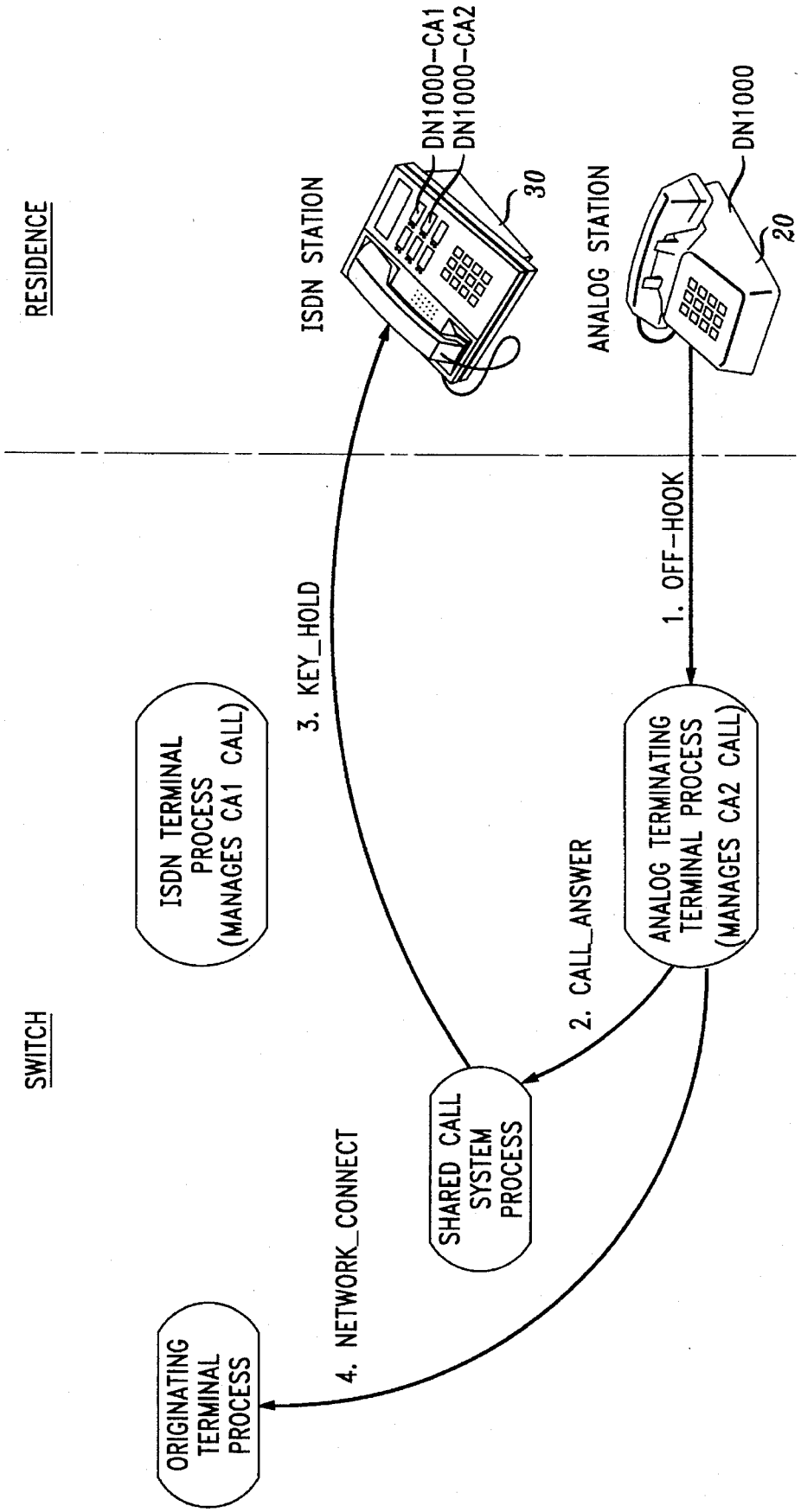
Figure 21:
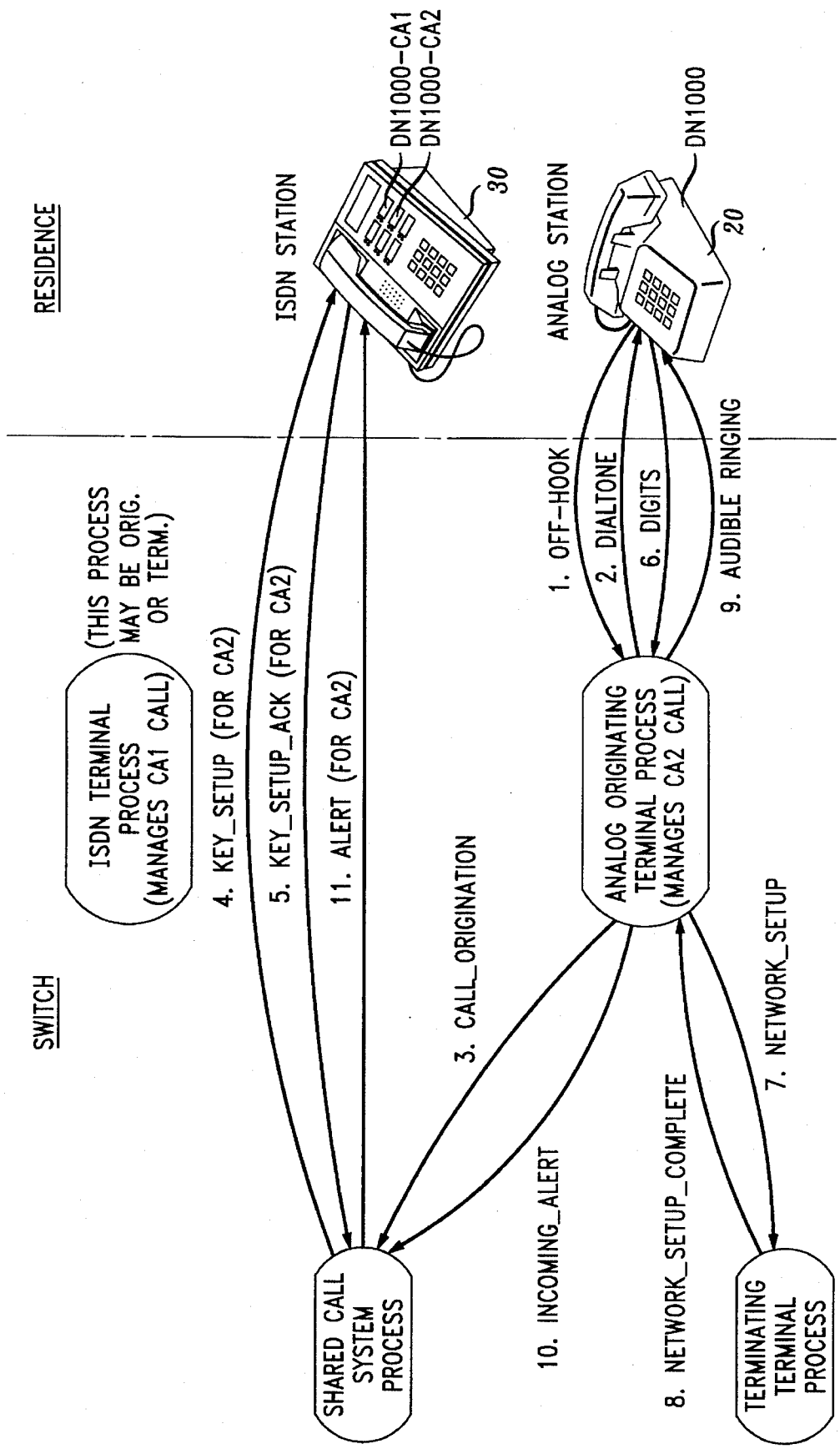
Figure 22:
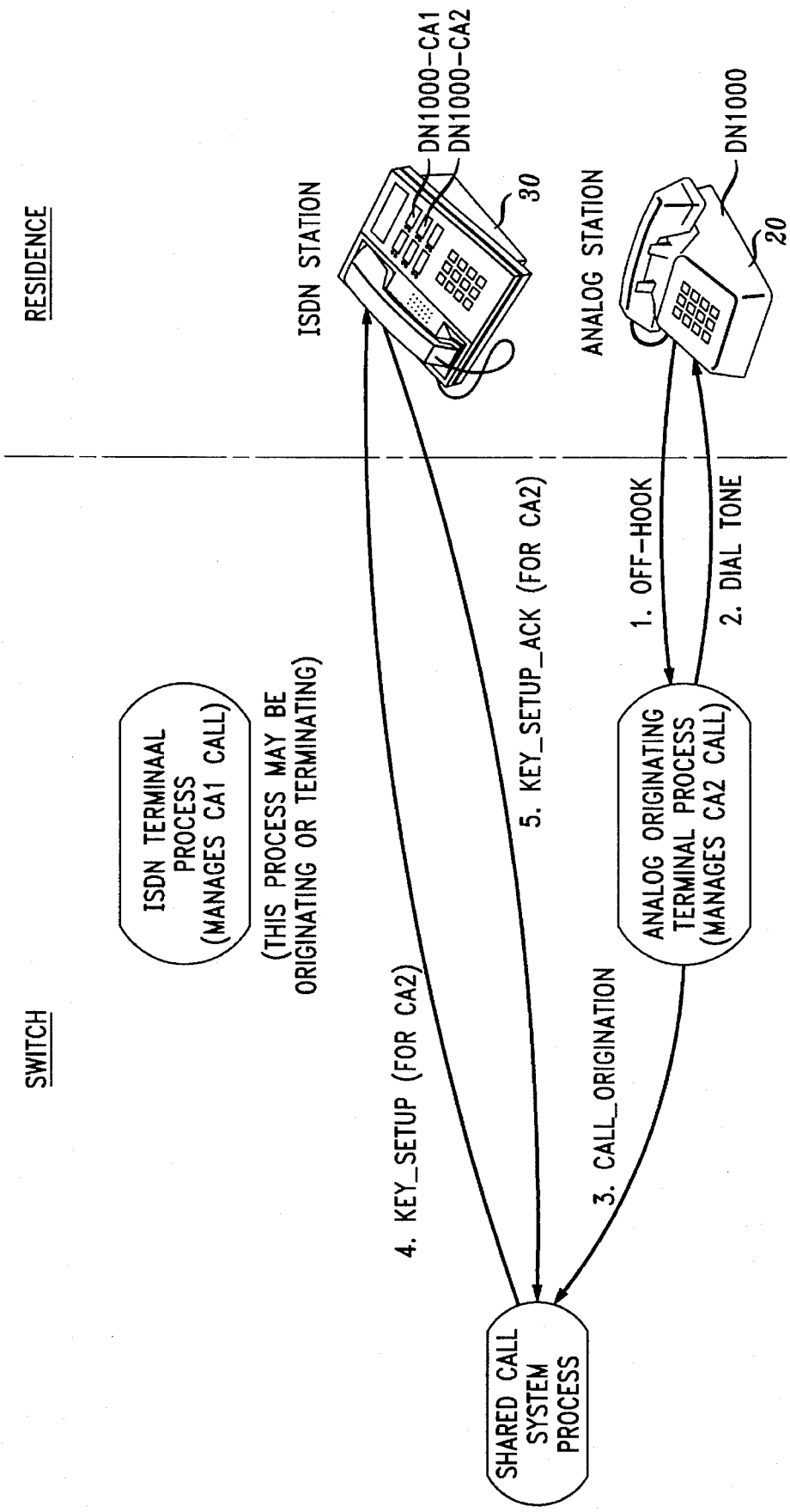
Figure 23:
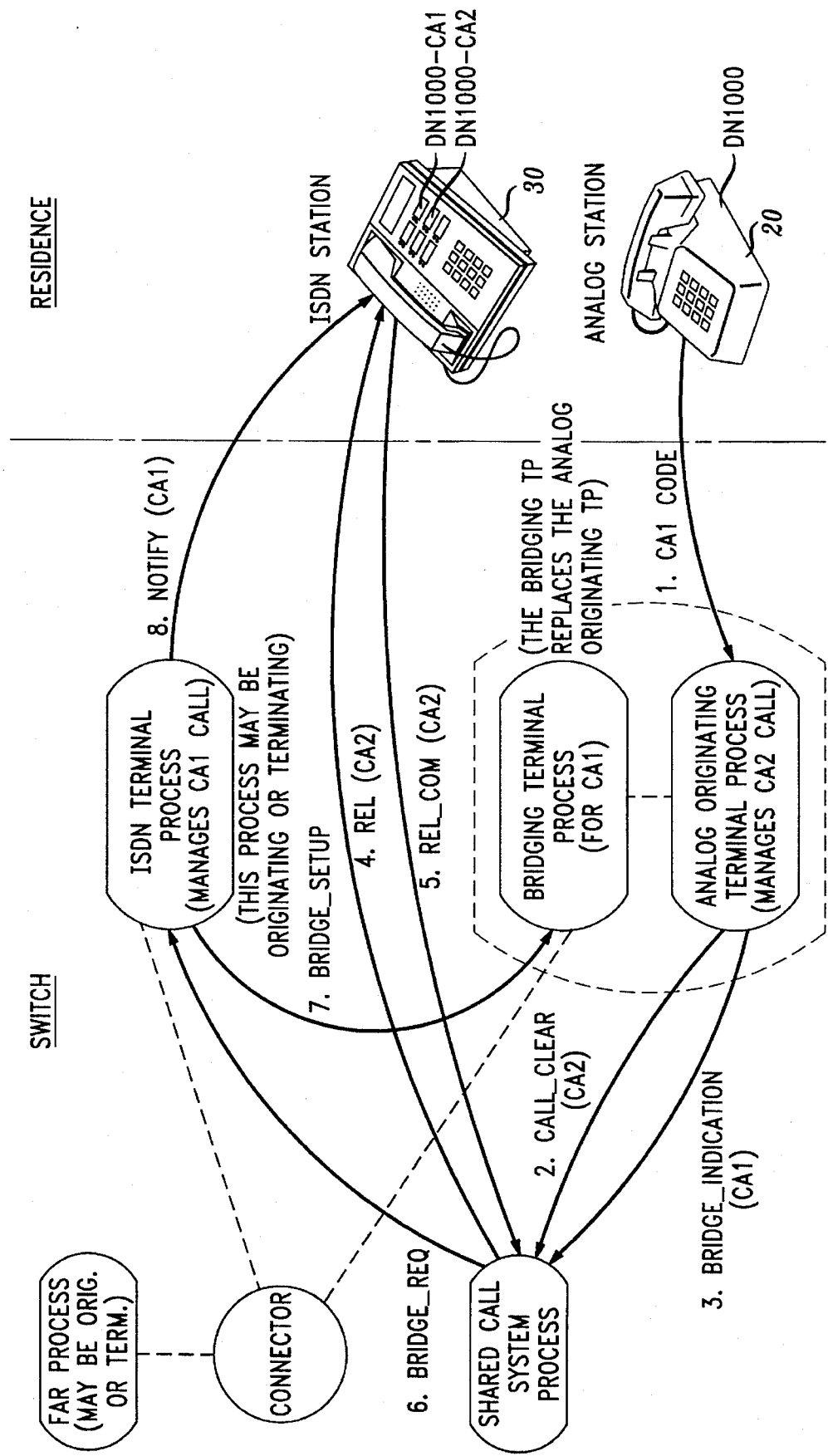
Figure 24:
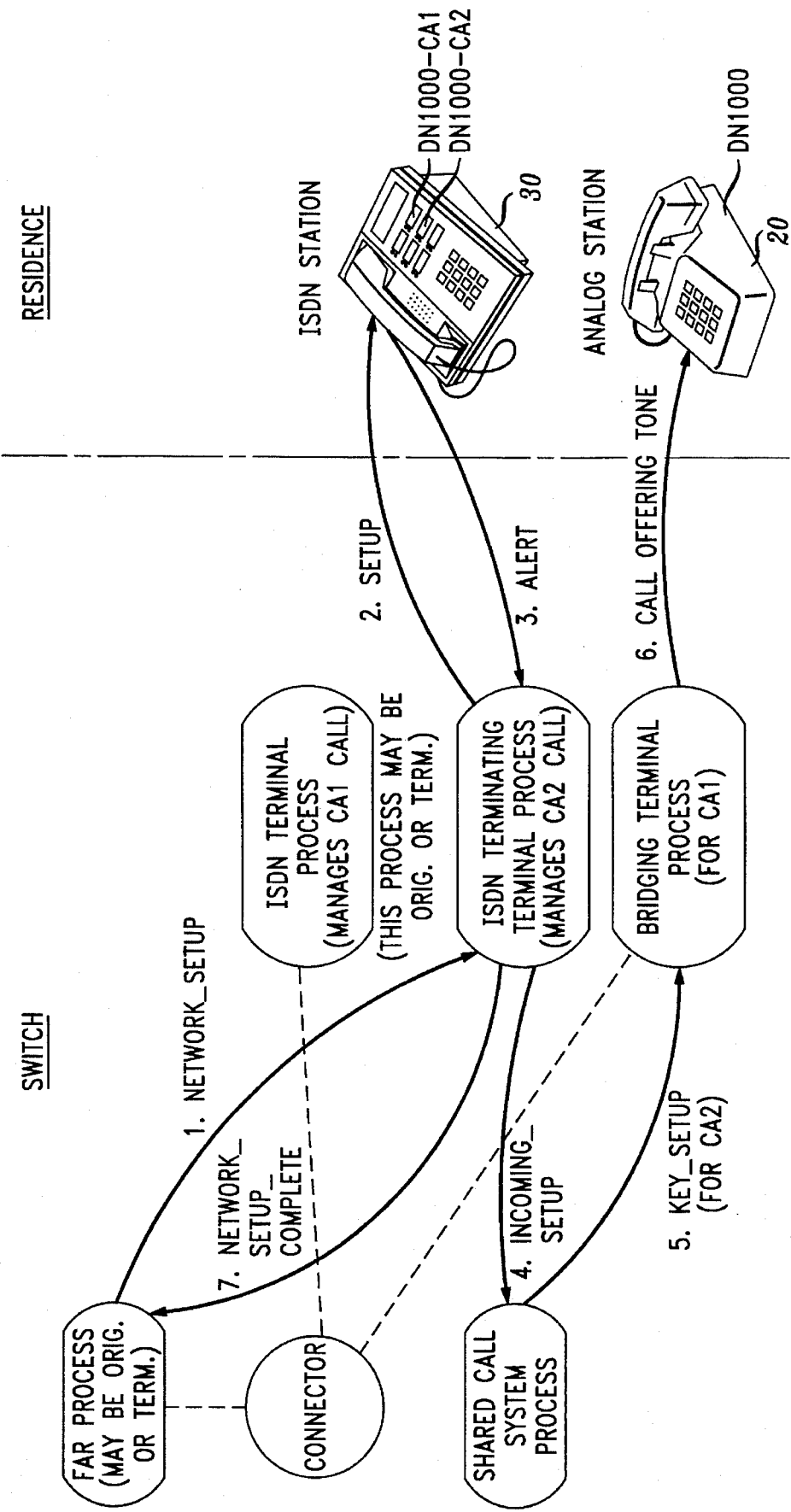
Figure 25:
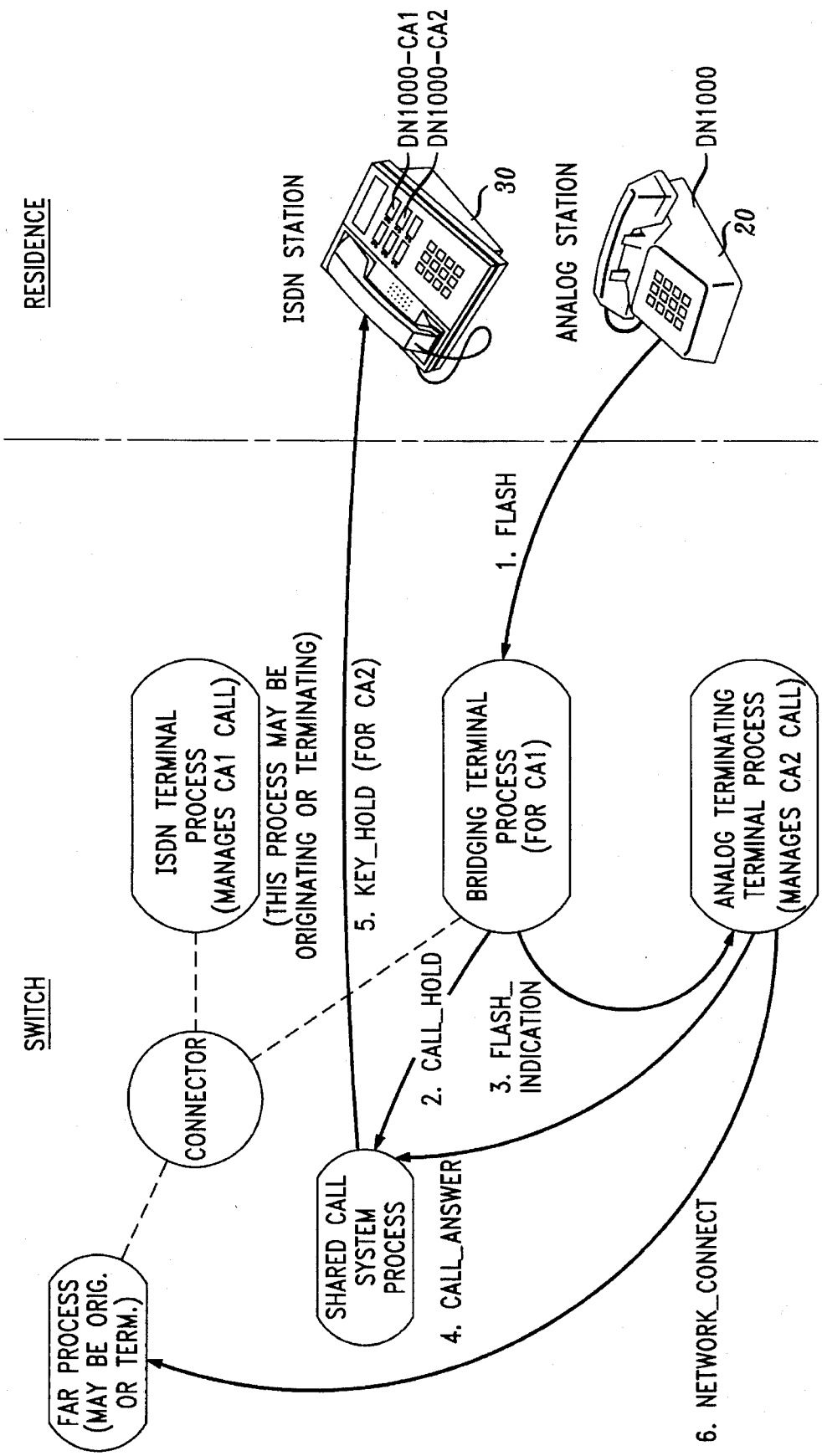
Figure 26:
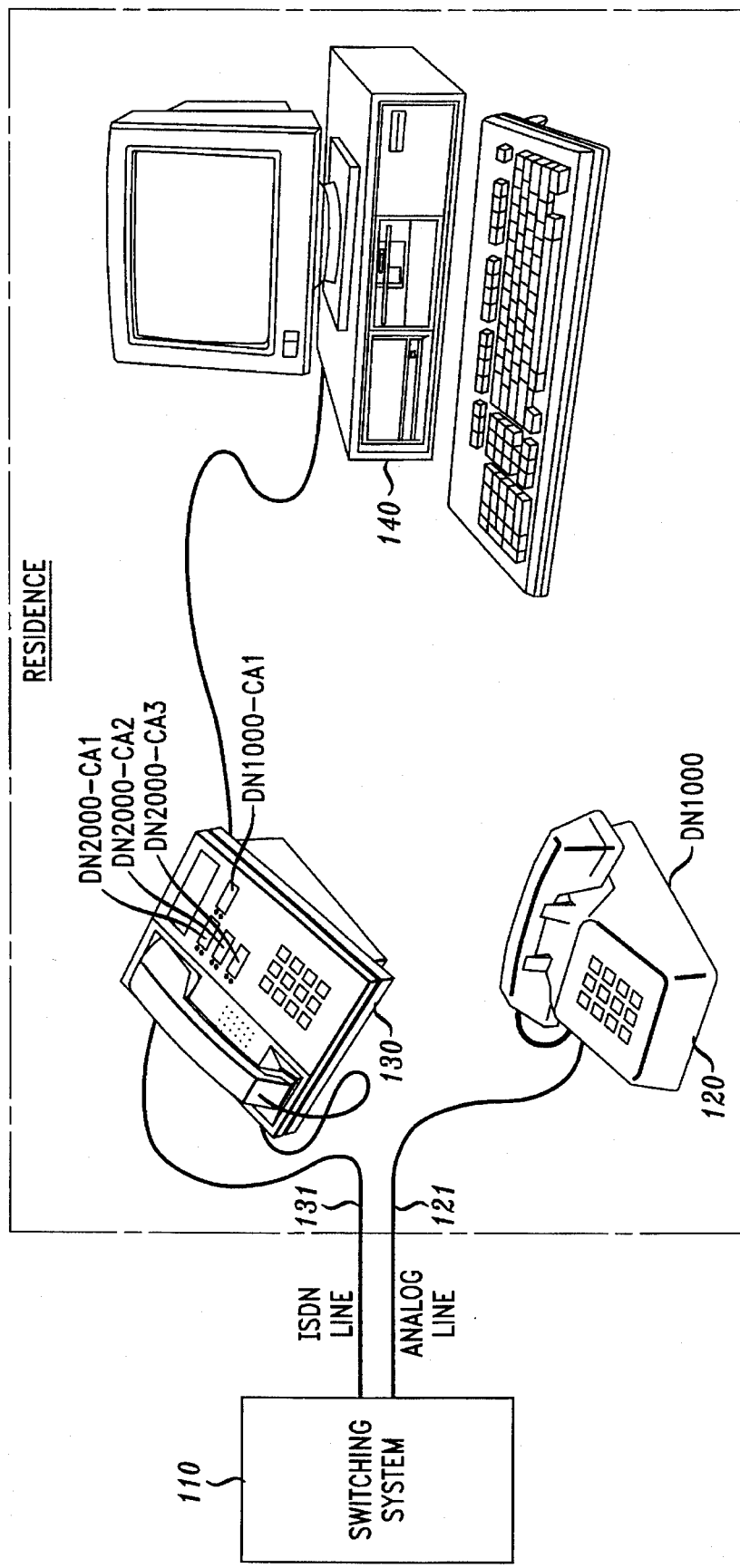
FIG. 26 is a diagram of an arrangement where a prior art method is performed.

FIGS. 4–25 are process diagrams associated with the implementation of Tables 1 and 2 in system 10. Each FIG. shows the events associated with one line of one of the tables, and references that line by table number and line letter. Thus, for Table 1, FIG. 4 illustrates Table 1 line A; FIG. 5 illustrates Table 1 line B; FIG. 6 illustrates Table 1 line C; FIG. 7 illustrates line D; FIG. 8 illustrates line E; FIG. 9 illustrates line F; FIG. 10 illustrates line G; FIG. 11 illustrates line H; and FIG. 12 illustrates line I. Similarly for Table 2 FIG. 13 illustrates Table 2 line a; FIG. 14 illustrates Table 2 line b; FIG. 15 illustrates Table 2 line c; FIG. 16 illustrates Table 2 line d; FIG. 17 illustrates Table 2 line e; FIG. 18 illustrates Table 2 line f; FIG. 19 illustrates Table 2 line g; FIG. 20 illustrates Table 2 line h; FIG. 21 illustrates Table 2 line i; FIG. 22 illustrates Table 2 line j; FIG. 23 illustrates Table 2 line k; FIG. 24 illustrates Table 2 line l; and FIG. 25 illustrates Table 2 line m. FIGS. 4–25 present a logical view of the feature based on modifications to the prior art Shared DN/Electronic Key Telephone System (EKTS) architecture in the AT&T 5ESS® switch as disclosed in the above-referenced Ahnen et al. patent.

For each call depicted, there is an Originating Terminal Process (OTP) and a Terminating Terminal Process (TTP). If the call originates or terminates on a shared Call Appearance (CA), there are also one or more Shared Call System Processes (SCSPs) involved in the call (one for each switching module of the 5ESS switch). For simplicity, only one SCSP is shown per scenario step.

When a call originates on a shared CA, an OTP is created for the originating port. The OTP receives messages from and sends messages to the originating terminal, and receives messages from and sends messages to the TTP for the call. In addition, it sends messages to the SCSP when there are changes in call state or status that need to be communicated to other stations that share the CA. The SCSP sends messages directly to those stations.

When a call terminates to a shared CA, a TTP is created for one of the ISDN CAs and it receives a NETWORK_SETUP for the call. It sends a SETUP message to the ISDN station and sends a message to the SCSP so that it can send SETUPs to the other ISDN stations that share the CA. If an analog station shares the CA, a TTP is created to provide power ringing to the station (assuming there is not another active call on that station).

When the call is answered, the TTP is moved to the port that answered the call, if necessary. If there was an analog TTP providing power ringing and the analog station did not answer, the analog TTP is killed.

The TTP continues to receive messages from and send messages to the terminal it represents and to and from the OTP. It sends messages to the SCSP, when necessary, so that it can notify the other stations that share the CA of call events.

An additional process, a Bridging Terminal Process (BTP), is created when a shared call is bridged. It represents the bridging party and receives messages from and sends messages to that station. Like the OTP and TTP, it sends messages to the SCSP when other stations that share the CA need to be informed of changes in the call state or status. The BTP is connected to the OTP and TTP via a connector (a 3-port or 6-port conference circuit).

A fundamental change to the prior art architecture is the introduction of multiple CAs, and consequently the possibility of multiple Terminal Processes (TPs), for a single analog station. For example, if an analog station answers an incoming call that was offered on the first CA of the shared ISDN station, a TTP for CA1 is created. If a second call terminates to the shared DN, it will be offered on CA2 on the ISDN station, and via a call offering tone during the active call on the analog station. If the analog station flashes to answer, a second TTP is created for the CA2 call and is associated with the analog port.

When the analog station originates a call an OTP is created for the first available CA. If there are no available CAs, a special OTP is created to handle a bridging attempt.

The following description details the changes to the prior art architecture. (No new logic is illustrated in FIGS. 4–6, 10, and 13–15.)

FIG. 7

D: New logic—Shared Call System Process recognizes that CA2 is shared with the analog station and sends a KEY_SETUP to the active analog TP.

Analog TP for CA1 provides call offering tone to the analog station when it receives the KEY_SETUP message.

FIG. 8

E: New logic—Analog TP for CA1, upon receiving a flash causes a TP for CA2 to be created and sends a FLASH_INDICATION to it.

Analog TP for CA2 establishes a talking path between the originator and the analog station (the path is moved from the ISDN process where it was initially established) and sends a CALL_ANSWER to the Shared Call System Process so that it can notify the other EKTS members that the call was answered.

FIG. 9

F: New logic—Shared Call System Process recognizes that CA2 is shared by the analog station and that there is an active call for CA2 on that station. It passes a BRIDGE_REQ message to the Analog TP for CA2 in response to the RETrieve message from the ISDN station.

Analog TP for CA2 seizes a conference circuit, requests that a Bridging TP be created, and establishes the path to it.

FIG. 11

H: New logic—Shared Call System Process recognizes that CA2 is shared with the analog station and sends a KEY_SETUP to the active analog TP.

Analog TP for CA1 provides call offering tone to the analog station when it receives the KEY_SETUP message. Call offering tone can be provided on a bridged call.

FIG. 12

I: New logic—Analog TP for CA1, upon receiving a flash, causes a TP for CA2 to be created and sends a FLASH_INDICATION to it. Flashing is allowed on a bridged call.

Analog TP for CA2 establishes a talking path between the originator and the analog station (the path is moved from the ISDN process where it was initially established) and sends a CALL_ANSWER message to the Shared Call System Process so that it can notify the other EKTS members that the call was answered.

FIG. 16 d: New logic—Shared Call System Process recognizes that CA2 is shared with the analog station and sends a KEY_SETUP to the Analog Terminating TP.

Analog TP for CA2 provides power ringing to the analog station when it receives the KEY_SETUP message.

FIG. 17 e: New logic—The Shared Call System Process kills the Analog Terminating TP that is providing power ringing for the call offered on CA2 when it receives the CALL_ANSWER message.

FIG. 18 f: New logic—Shared Call System Process creates a special Analog Originating TP which is not associated with any CA when the analog user goes offhook but there are no CAs available for call origination.

The Analog Originating TP, in response to a NO_CA_ORIGINATION message from the Shared Call System Process, provides a signal to the analog station that there are no resources available for a call origination—the only action the analog subscriber can take is to dial a code to bridge onto one of the active calls on CA1 or CA2.

FIG. 19 g: New logic—Analog Originating TP is able to accept dialed codes which indicate bridging requests and sends a BRIDGE_INDICATION message to the Shared Call System Process.

Shared Call System Process recognizes the BRIDGE_INDICATION message as a request to bridge onto the active call on CA2. It sends a BRIDGE_REQ message to the ISDN TP for CA2.

ISDN TP for CA2 seizes a conference circuit, requests that a Bridging TP be created from the Analog Originating TP, and establishes the path to it.

FIG. 20 h: New logic—Analog TP for CA2 establishes a talking path between the originator and the analog station (the path is moved from the ISDN process where it was initially established) and sends a CALL_ANSWER to the Shared Call System Process so that it can notify the other EKTS members that the call was answered.

FIG. 21 i: New logic—The offhook from the analog station is received by the TP for CA2, since CA2 is the first idle call appearance. The TP handles the call as a normal origination.

Shared Call System Process recognizes that the call is being originated on CA2 and sends call progress messages to the ISDN station.

FIG. 22 j: New logic—The offhook from the analog station is received by the TP for CA2, since CA2 is the first idle call appearance. The TP cannot distinguish between this situation and a normal call origination, so it takes the same actions as it would in that case.

Shared Call System Process recognizes that a call is being originated on CA2 and notifies the ISDN station with a KEY_SETUP.

FIG. 23 k: New logic—Analog TP for CA2 interprets the dialed code from the analog station as a request to bridge onto the call on CA1. It clears the origination on CA2 by sending a CALL_CLEAR to the Shared Call System Process. It initiates the bridge by sending a BRIDGE_INDICATION to the Shared Call System Process.

Shared Call System Process recognizes the BRIDGE_INDICATION as a request to bridge onto the active call on CA1. It sends a BRIDGE_REQ message to the ISDN TP for CA1.

ISDN TP for CA2 seizes a conference circuit, requests that a Bridging TP be created from the Analog Originating TP, and establishes the path to it.

This scenario has the undesirable effect of notifying the ISDN station of a call origination on CA2, and then almost immediately clearing it when it is discovered that the user wanted to bridge. An alternative method would be to not send the KEY_SETUP to the ISDN station until it is determined that the user is placing a call on that CA.

FIG. 24 l: New logic—Shared Call System Process recognizes that CA2 is shared with the analog station and sends a KEY_SETUP to the active analog TP, which is the Bridging TP.

Bridging TP for CA1 provides call offering tone to the analog station when it receives the KEY_SETUP message. Call offering tone can be provided on a bridged call.

FIG. 25 m: New logic—Bridging TP, upon receiving a flash causes a TP for CA2 to be created and sends a FLASH_INDICATION to it. Flashing is allowed on a bridged call.

Analog TP for CA2 must establish a talking path between the originator and the analog station (the path must be moved from the ISDN process where it was initially established) and must send a CALL_ANSWER to the Shared Call System Process so that it can notify the other EKTS members that the call was answered.

It is to be understood that the above-described embodiment is merely illustrative of the principles of the invention and that many variations may be devised by those skilled in the art without departing from the spirit and scope of the invention. It is therefore intended that such variations be included within the scope of the claims.

We claim:

1. A method for use by a switching system in serving at least one analog station via an analog line and at least one ISDN station via an ISDN line, where a given directory number for analog services is assigned to both said analog station and said ISDN station, said method comprising:

in response to a first call to or from said given directory number, establishing a call connection with said analog station for said first call and effecting indication of an active status at a first call appearance of a given directory number at said ISDN station, in response to a second call to said given directory number, providing a call offering signal to said analog station and effecting alerting at a second call appearance of said given directory number at said ISDN station, and in response to signaling from said analog station, placing said first call on hold, connecting said second call to said analog station, and effecting indication of an active status at said second call appearance.

2. A method in accordance with claim 1 further comprising in response to signaling from said ISDN station, bridging said second call appearance onto said second call.

3. A method for use by a switching system in serving at least one analog station via an analog line and at least one ISDN station via an ISDN line, where a given directory number for analog services is assigned to both said analog station and said ISDN station, said method comprising:

in response to a first call to or from said given directory number, establishing a call connection with said analog station for said first call and effecting indication of an active status at a first call appearance of said given directory number at said ISDN station, bridging said first call appearance onto said first call, in response to a second call to said given directory number, providing a call offering signal to said analog station and effecting alerting at a second call appearance of said given directory number at said ISDN station, and in response to signaling from said analog station, connecting said second call to said analog station and effecting indication of an active status at said second call appearance.

4. A method for use by a switching system in serving at least one analog station via an analog line and at least one ISDN station via an ISDN line, where a given directory number for analog services is assigned to both said analog station and said ISDN station, said method comprising:

in response to a first call to or from said given directory number, establishing a call connection with said ISDN station for said first call and effecting indication of an active status at a first call appearance of said given directory number at said ISDN station, in response to a second call to said given directory number, effecting alerting at said analog station and at a second call appearance of said given directory number at said ISDN station, in response to signaling from said ISDN station, placing said first call on hold, connecting said second call to said ISDN station and effecting indication of an active status at said second call appearance, and in response to off-hook signaling from said analog station, providing signaling to said analog station indicating that no outgoing call can be made from said analog station.

5. A method in accordance with claim 4 further comprising in response to dial code signaling from said analog station, bridging said analog station onto said second call.

6. A method for use by a switching system in serving at least one analog station via an analog line and at least one ISDN station via an ISDN line, where a given directory number for analog services is assigned to both said analog station and said ISDN station, said method comprising:

in response to a first call to or from said given directory number, establishing a call connection with said ISDN station for said first call and effecting indication of an active status at a first call appearance of said given directory number at said ISDN station, in response to a second call to said given directory number, effecting alerting at said analog station and at a second call appearance of said given directory number at said ISDN station, and in response to signaling from said analog station, connecting said second call to said analog station and effecting indication of an active status at said second call appearance.

7. A method for use by a switching system in serving at least one analog station via an analog line and at least one ISDN station via an ISDN line, where a given directory number for analog services is assigned to both said analog station and said ISDN station, said method comprising in response to a first call to or from said given directory number, establishing a call connection with said ISDN station for said first call and effecting indication of an active status at a first call appearance of said given directory number at said ISDN station, and in response to signaling from said analog station, completing a second call from said analog station and effecting indication of an active status at a second call appearance of said given directory number at said ISDN station.

8. A method for use by a switching system in serving at least one analog station via an analog line and at least one ISDN station via an ISDN line, where a given directory number for analog services is assigned to both said analog station and said ISDN station, said method comprising in response to a first call to or from said given directory number, establishing a call connection with said ISDN station for said first call and effecting indication of an active status at a first call appearance of said given directory number at said ISDN station, in response to off-hook signaling from said analog station, providing dial tone to said analog station and effecting indication of an active status at a second call appearance of said given directory number at said ISDN station, and in response to dial code signaling from said analog station, bridging said analog station onto said first call and effecting indication of an inactive status at said second call appearance.

9. A method for use by a switching system in serving at least one analog station via an analog line and at least one ISDN station via an ISDN line, where a given directory number for analog services is assigned to both said analog station and said ISDN station, said method comprising in response to a first call to or from said given directory number, establishing a call connection with said ISDN station for said first call and effecting indication of an active status at a first call appearance of said given directory number at said ISDN station, in response to signaling from said analog station, bridging said analog station onto said first call, and in response to a second call to said given directory number, providing a call offering signal to said analog station and effecting alerting at a second call appearance of said given directory number.

10. A method in accordance with claim 9 further comprising in response to signaling from said analog station, connecting said second call to said analog station and effecting indication of an active status at said second call appearance.

11. A method for use by a switching system in serving at least one analog station and a human user thereof via an analog line, and at least one ISDN station via an ISDN line, where a given directory number is assigned to both said analog station and said ISDN station, said method comprising:

in response to a first call to or from said given directory number, establishing a call connection with said analog station for said first call and effecting indication of an active status at a first call appearance of said given directory number at said ISDN station, in response to a second call to said given directory number, providing an audible call offering signal to said user via said analog station and effecting alerting at a second call appearance of said given directory number at said ISDN station, and in response to signaling from said analog station that are initiated by said user, placing said first call on hold, connecting said second call to said analog station, and effecting indication of an active status at said second call appearance.

12. A method for use by a switching system in serving at least one analog station and a human user thereof via an analog line, and at least one ISDN station via an ISDN line, where a given directory number is assigned to both said analog station and said ISDN station, said method comprising:

in response to a first call to or from said given directory number, establishing a call connection with said analog station for said first call and effecting indication of an active status at a first call appearance of said given directory number at said ISDN station, in response to a second call to said given directory number, providing an audible call offering signal to said user via said analog station and effecting alerting at a second call appearance of said given directory number at said ISDN station, and in response to hook-switch flash signaling from said analog station, placing said first call on hold, connecting said second call to said analog station, and effecting indication of an active status at said second call appearance.

13. A method for use by a switching system in serving at least one analog station and a human user thereof via an analog line, and at least one ISDN station via an ISDN line, where a given directory number is assigned to both said analog station and said ISDN station, said method comprising:

in response to a first call to or from said given directory number, establishing a call connection with said analog station for said first call and effecting indication of an active status at a first call appearance of said given directory number at said ISDN station, in response to a second call to said given directory number, providing an audible call offering signal to said user via said analog station and effecting alerting at a second call appearance of said given directory number at said ISDN station, and in response to hook-switch flash signaling from said analog station that are initiated by said user, placing said first call on hold, connecting said second call to said analog station, and effecting indication of an active status at said second call appearance.

14. A method in accordance with claim 11 further comprising in response to signaling from said ISDN station, bridging said second call appearance onto said second call.

* * * * *